United States Patent [19]

Yagi et al.

[11] Patent Number: 4,748,952

[45] Date of Patent: Jun. 7, 1988

[54] IGNITION TIMING CONTROL SYSTEM FOR INTERNAL COMBUSTION ENGINE

[75] Inventors: Shizuo Yagi, Asaka; Yoshiaki Hirosawa, Shiki; Makoto Kawai, Tokorozawa; Yorihisa Yamamoto, Shiki; Haruhiko Yoshikawa, Niiza; Kenichi Nakamura, Fujimi, all of Japan

[73] Assignee: Honda Giken Kogyo Kabushiki Kaisha, Tokyo, Japan

[21] Appl. No.: 868,586

[22] Filed: May 30, 1986

[30] Foreign Application Priority Data

| May 30, 1985 | [JP] | Japan | 60-117231 |
| Aug. 7, 1985 | [JP] | Japan | 60-173898 |
| Aug. 9, 1985 | [JP] | Japan | 60-175178 |
| Feb. 25, 1986 | [JP] | Japan | 61-040106 |

[51] Int. Cl.⁴ .................... F02D 37/00; F02P 9/04; F02P 5/04
[52] U.S. Cl. .................... 123/425; 123/416; 123/417
[58] Field of Search ............... 123/425, 406, 416, 417, 123/418

[56] References Cited

U.S. PATENT DOCUMENTS

| 3,957,023 | 5/1976 | Peterson | 123/425 |
| 4,190,027 | 2/1980 | Inui et al. | 123/425 |
| 4,211,194 | 7/1980 | Hattori et al. | 123/425 |
| 4,328,779 | 5/1982 | Hattori et al. | 123/425 |
| 4,397,285 | 8/1983 | O'Neill | 123/425 |
| 4,406,265 | 9/1983 | Brandt et al. | 123/425 |
| 4,417,556 | 11/1983 | Latsch | 123/425 |
| 4,466,408 | 8/1984 | Cheklich | 123/425 |
| 4,481,925 | 11/1984 | Karau et al. | 123/425 |
| 4,539,957 | 9/1985 | Haraguchi et al. | 123/425 |
| 4,541,382 | 9/1985 | Hosoe et al. | 123/425 |
| 4,542,727 | 9/1985 | Britsch et al. | 123/425 |
| 4,549,513 | 10/1985 | Douaud et al. | 123/425 |
| 4,582,034 | 4/1986 | Iwata | 123/425 |
| 4,596,218 | 6/1986 | Karau et al. | 123/425 |
| 4,601,272 | 7/1986 | Nagai | 123/425 |
| 4,638,780 | 1/1987 | Trinh et al. | 123/425 |
| 4,640,249 | 2/1987 | Kawamura et al. | 123/425 |
| 4,660,535 | 4/1987 | Asano | 123/425 |

Primary Examiner—Raymond A. Nelli
Attorney, Agent, or Firm—Birch, Stewart, Kolasch & Birch

[57] ABSTRACT

An ignition timing control system for an internal combustion controls the ignition timing in dependence upon an indicative pressure signal representing changes of the inner pressure within the combustion chamber of the engine. The ignition timing control system ceases the feed-back control based on the indicative pressure signal but performs an open loop control under predetermined engine operational conditions.

14 Claims, 28 Drawing Sheets

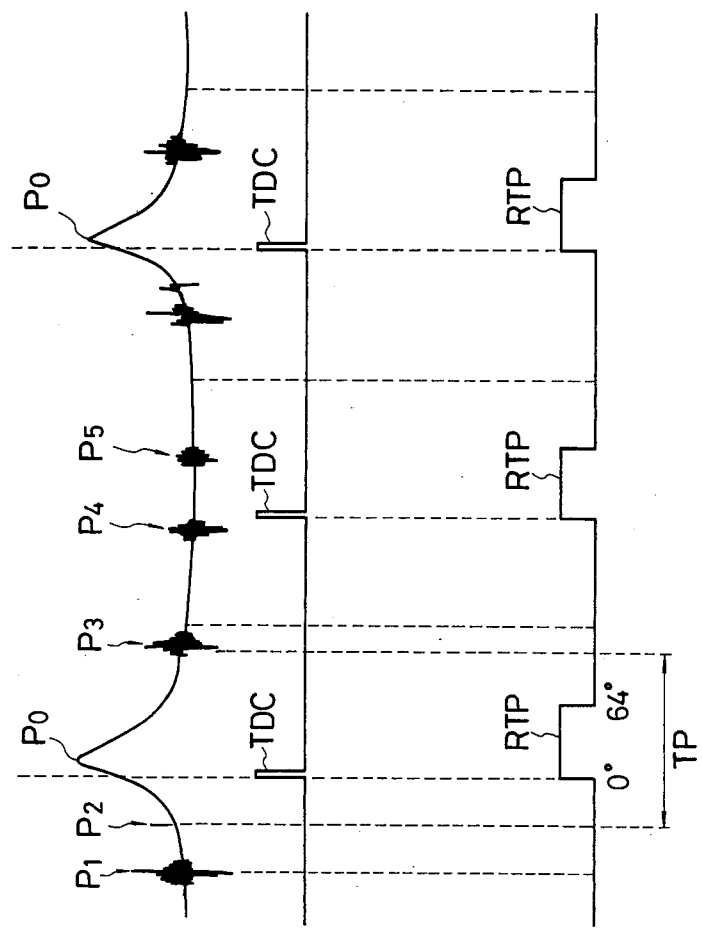

IGNITION PULSE

FIG. 17
FIG. 18
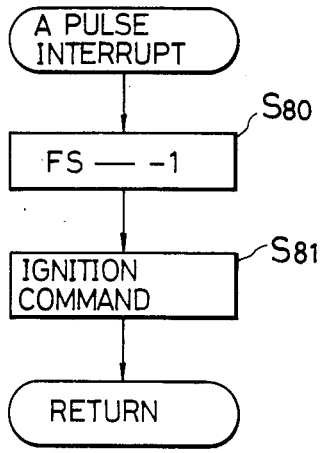
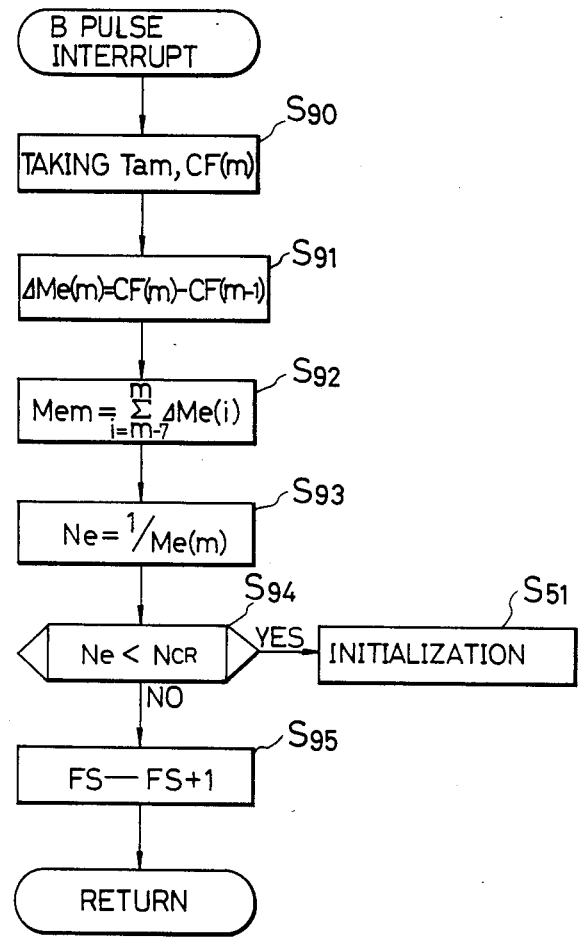

FIG. 28(a)
FIG. 28(b)
FIG. 28(c)
FIG. 28(d)
FIG. 28(e)
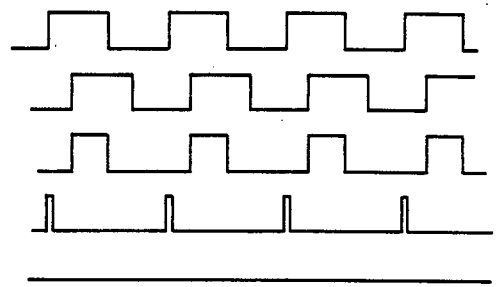
FIG. 29(a)
FIG. 29(b)
FIG. 29(c)
FIG. 29(d)
FIG. 29(e)
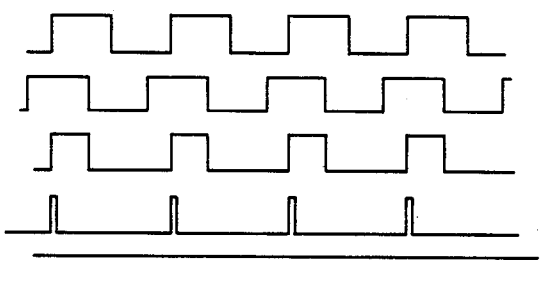

IGNITION TIMING CONTROL SYSTEM FOR INTERNAL COMBUSTION ENGINE

FIELD OF THE INVENTION

The present invention relates to an ignition timing control system for an internal combustion engine and, in particular, to an ignition timing control system for controlling the ignition timing of an internal combustion engine so as to cause the maximum pressure within the combustion chamber due to combustion to occur during an optimum crank angle region.

BACKGROUND OF THE INVENTION

It is possible to obtain the so-called indicative pressure signal representative of the inner pressure of the combustion chamber of an internal combustion engine by providing a pressure sensor such as a piezo-electric element in a bore formed through a member forming the combustion chamber of the engine such as a cylinder head. A pressure gauge may be otherwise interposed between the cylinder head and the cylinder block of the engine, which functions as the pressure sensor for producing the indicative pressure signal.

It will be seen that the internal pressure in the combustion chamber under operation of the engine changes as indicated by a curve A in FIG. 1. When the ignition system of the engine is triggered at an ignition angle $\theta IG$, the air-fuel mixture supplied thereto starts firing with a time delay of $\theta d$ and, subsequently, the internal pressure rapidly increases up to a maximum pressure peak (referred to as an indicative pressure peak hereinafter) and then decreases.

It is known that a crank angle position of the indicative pressure peak has a certain relationship with the state of the engine at which the maximum output is produced, and the indicative pressure peak giving the maximum engine output has been found, by experiment, to be located between 12 to 13 degrees after the top dead center (referred to as ATDC hereinafter) as shown in the drawings. Therefore, ATDC 12 to 13 degrees may be considered as an ideal crank angle region. It is therefore desirable to determine the ignition timing $\theta IG$ so that the indicative pressure peak occurs within the ideal crank angle region which is ATDC 12 to 13 degrees.

Even if, however, the ignition timing $\theta IG$ is determined, the indicative pressure peak varies from time to time depending on the operating conditions of the engine and, therefore, an ignition timing control device is desired which can constantly keep the indicative pressure peak within the optimum region.

A feed-back ignition timing control system is disclosed in U.S. Pat. No. 4,481,925 issued Nov. 13, 1984. The feed-back ignition timing control system controls the ignition timing of an internal combustion engine in response to the indicative pressure signal to keep the indicative pressure peak position within an optimum region.

This prior art ignition control system is advantageous in avoiding any adverse influence by high frequency noises contaminating the indicative pressure signal.

It is, however, still required to regulate the ignition timing of the intenal combustion engine in a more flexible manner so as to comply with various engine operational conditions while avoiding the influence of noise.

SUMMARY OF THE INVENTION

Thus, a primary object of this invention is to provide an improved ignition timing control method for an internal combustion engine which can optimally control the ignition angle in accordance with an indicative pressure peak position signal and one or more engine parameters representing engine operational conditions.

In the ignition timing control method according to the present invention, the internal pressure of a cylinder is directly detected as an indicative pressure peak signal giving the indicative pressure peak datum for every engine cycle. The indicative pressure peak datum is compared with a crank angle reference position datum while changing the manner of discrimination in dependence on one or more of the engine parameters so that the actual ignition timing is advanced or retarded for every engine cycle thereby to comply with changes of the engine operational conditions.

SUMMARY OF THE DRAWINGS

FIG. 4A is a diagram showing a waveform of the indicative pressure signal.

FIG. 4B is a diagram showing a waveform of reference pulses.

FIG. 4C is a diagram showing gate timings for receiving the indicative pressure peak data.

FIGS. 17 and 18 are flowcharts respectively showing subroutine programs interruptedly performed during the operation of the program of FIG. 15.

FIGS. 28(a) through 28(e) are diagrams respectively showing waveforms of signals appearing in the circuit of FIG. 27 under a normal rotation of the engine.

FIGS. 29(a) through 29(e) are diargams respectively showing waveforms of signals appearing in the circuit FIG. 24 under a reverse rotation of the engine.

DETAILED DESCRIPTION OF EMBODIMENTS

Figure 2:
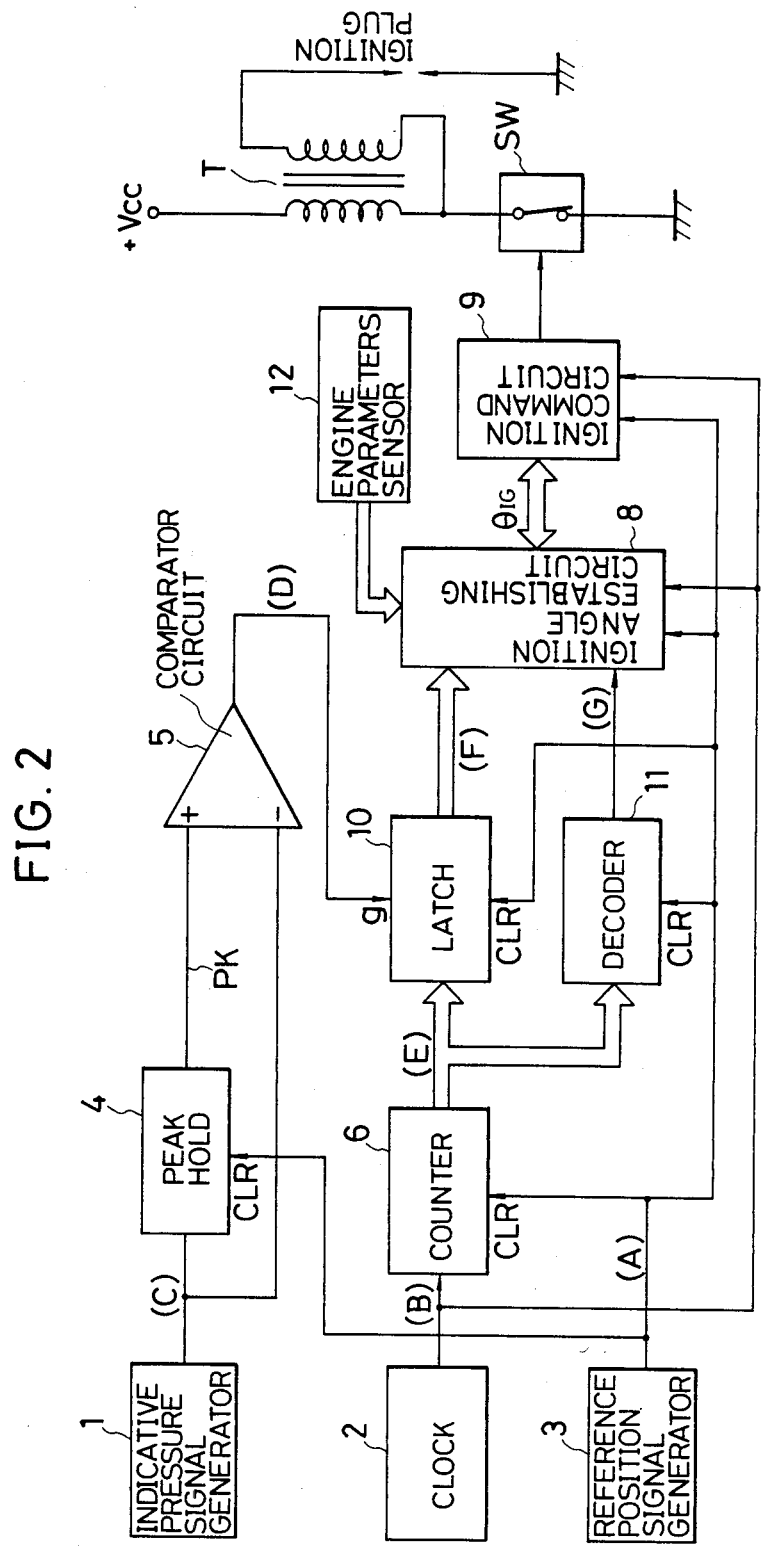
FIG. 2 is a circuit diagram showing an embodiment of the present invention.

FIG. 2 shows an ignition timing control system according to the present invention, and this system comprises an indicative pressure signal generating circuit 1 which generates an indicative pressure signal by using pressure sensor which may include a piezo-electric element and is inserted into a bore provided through a member such as a cylinder head which defines a combustion chamber of an internal combustion engine in such a manner that the detection head of the pressure sensor is exposed to the interior of the combustion chamber. A clock generating circuit 2 produces clock pulse appearing in synchronism with the rotation of the engine. This means for obtaining clock pulses in synchronism with the rotation of the engine may consist of a disc which rotates in synchronism with the engine and has a plurality of slits in combination with a photo-coupler in such a manner that the clock pulses may be obtained from the output signal of the photo-coupler. A reference position generating circuit 3 produces a reference position signal, for example a TDC (Top Dead Center) pulse, which indicates that the crank angle position or the engine rotational angle position has reached a reference position. The reference pulse may be obtained by providing a separate slit for pulses in the disc which is already provided with the slits used for the clock generating circuit 2, in combination with a photocoupler for generating reference pulses. The reference position may be a position before TDC, if preferred. A peak hold circuit 4 holds the maximum value of the indicative pressure signal after it is cleared by the reference position signal. A comparator circuit 5 produces a peak detection signal when the indicative pressure signal has fallen below its maximum value kept by the peak hold circuit 4. A counter 6 for measuring the crank angle position counts the number of clock pulses and is reset by the reference position signal. The count value of the counter 6 which may be 8-bit data indicates the current value of the crank angle. A latch circuit 10 latches the count value of the counter 6 every time the peak detection signal from the comparison circuit 5 is supplied to the gate terminal g of the latch circuit 10, while a decoder 11 supplies a read-in command signal to an ignition angle establishing circuit 8 when the count value of the counter 6 reaches a predetermined value, for instance "63". The count value of "63" corresponds to a crank angle which is greater than any crank angle at which the indicative pressure peak is expected to occur, and the read-in timing is so selected that there will be no interference by noises such as the combustion noises and the valve seating noises caused by the operation of the inlet and/or exhaust valves. The ignition angle establishing circuit 8 accordingly reads out or takes the contents of the latch circuit 10 and determines the indicative pressure peak position datum $\theta_{px}$ from the contents of the latch circuit 10. It is also possible to use a structure according to which the contents of the latch circuit 10 are supplied to the ignition timing establishing circuit 8 by way of a gate circuit which opens its gate by a read-in command signal from the decoder 11. The ignition angle establishing circuit 8 may consist of a microprocessor and supplies a desired ignition angle $\theta_{IG}$ datum to an ignition command circuit 9 according to a program, which is described hereinafter, and the peak position information (data) supplied thereto. The ignition command circuit 9 detects the current value of the crank angle $\theta_{ig}$ by counting the clock pulses and using the reference position signal as a reference, and closes an ignition switch SW when the current crank $\theta_{ig}$ and the input $\theta_{IG}$ coincide with each other, whereby ignition current is passed through the primary winding of an ignition transformer T and a spark ignition takes place at an ignition plug. Accordingly, the desired ignition angle $\theta_{IG}$ is a next-cycle ignition angle datum for governing the ignition during the next engine cycle succeeding to the engine cycle which caused the appearance of the indicative pressure peak $\theta_{px}$. The ignition angle establishing circuit 8 and the ignition command circuit 9 form, in the preferred embodiment, the ignition command means. The ignition angle establishing circuit 8 may be equipped with a mode in which the ignition angle establishing circuit 8 operates according to various parameters, such as rotational speed of the engine Ne, intake negative pressure $P_B$, throttle opening $\theta_{th}$ and so on, obtained from engine parameter sensors 12.

Figures 3A, 3B, 3C, 3D, 3E, 3F, 3G:
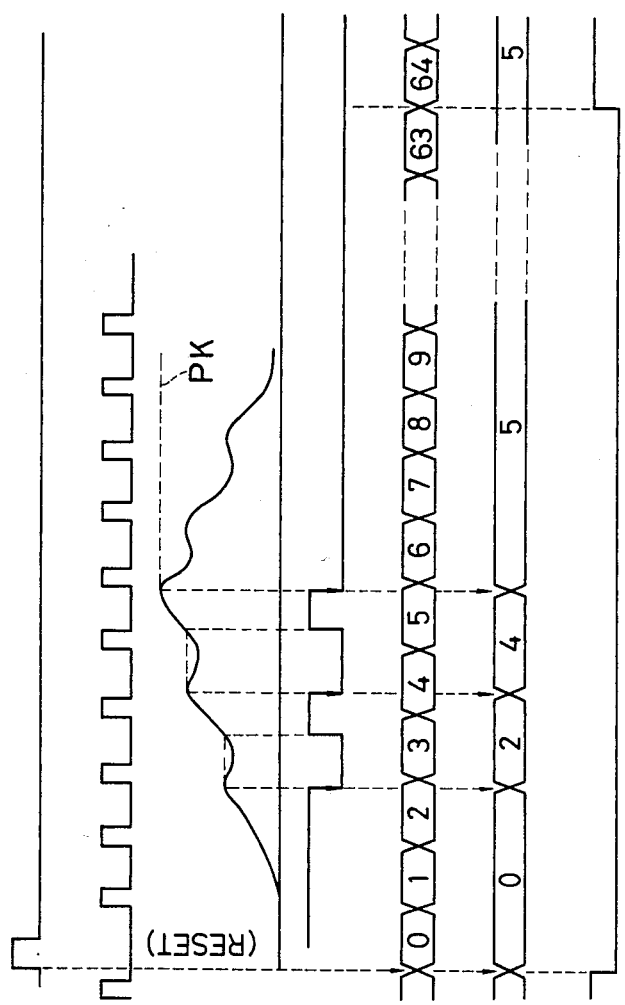
FIGS. 3A through 3G are diagrams illustrating waveforms of signals appearing in the circuit of FIG. 2.

FIGS. 3A to 3F show signal waveforms for illustrating the actions of the above-described circuits. Specifically, the reference position signal and the clock pulses appear as shown in FIGS. 3A and 3B, respectively. The indicative pressure signal changes in such a manner as shown by a solid line in FIG. 3C and the output of the peak hold circuit 4 therefore changes in such a manner as shown by the dotted line in FIG. 3C. The comparator circuit 5 produces a peak detection pulse signal upon detection of every local maximum of the indicative pressure signal as shown in FIG. 3D. FIG. 3E shows the changes of the count values of the counter 6 in decimals.

FIG. 3F shows the contents of the latch circuit 10 in decimals. FIG. 3G shows the changes in the output of the decoder 11 and, in this case, a higher level corresponds to the read-in command signal.

FIG. 4A shows an example of a waveform of the indicative pressure signal which contains maximum peak values $P_0$, valve seating noises $P_1$, $P_3$, $P_4$ and $P_5$, and an ignition noise $P_2$. FIG. 4B shows waveforms of the reference position pulses each appearing at the TDC. FIG. 4C shows that the ignition timing control system restricts the time period for picking up the maximum peak position information to a short time period RTP (0 degree to 64 degree), that is, from the TDC to the predetermined crank angle corresponding the decoding number of, in this embodiment, 63. The short time period RTP is contained within the time period from the ignition timing to the valve seating timing, so that the operation for picking up the maximum peak position information is not adversely affected by the ignition noises and valve seating noises etc.

Figure 1:
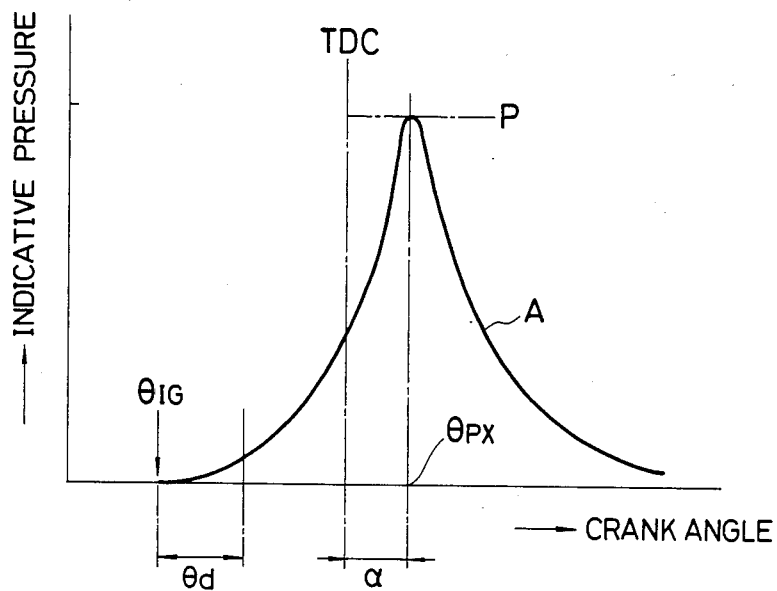
FIG. 1 is a graph showing the changes in the internal pressure of an engine cylinder.
Figure 5:
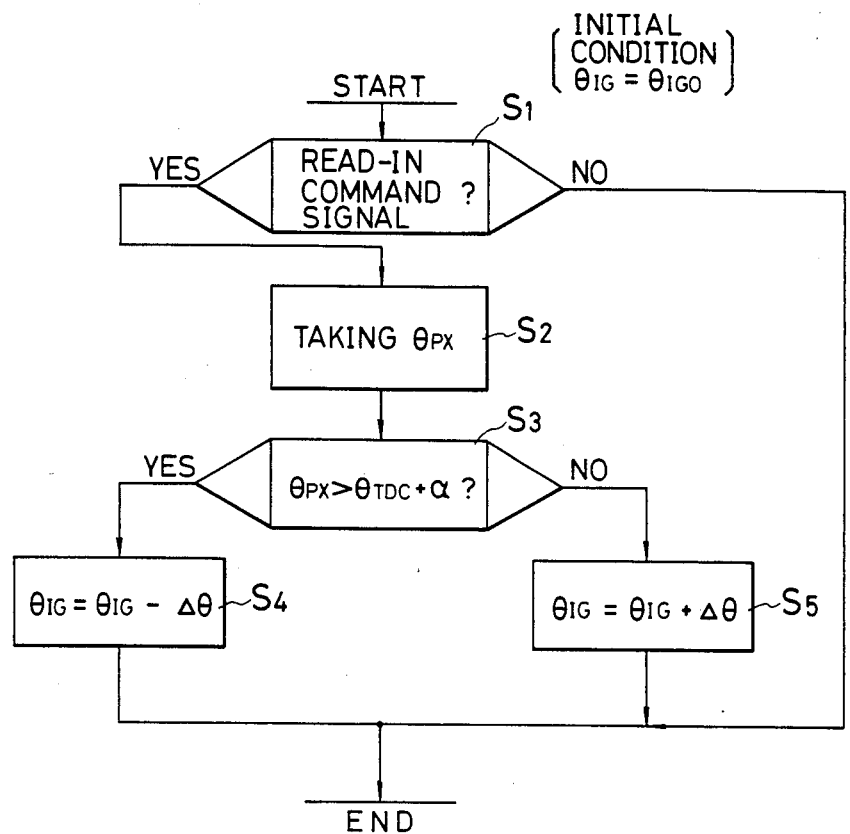
FIGS. 5 and 6 are flow charts describing basic action programs of the parts of the device of FIG. 2 made of a micro computer.

FIG. 5 shows an example of the program governing the ignition control operation of the ignition angle establishing circuit 8 of the system shown in FIG. 1 when the circuit 8 is made of a microprocessor. In performing the ignition control action, the ignition angle establishing circuit 8 initially establishes or determines the ignition angle $\theta_{IG}$ at an initial value $\theta_{IGO}$ and waits for the read-in command signal from the decoder 11, and, upon receipt of the read-in command signal, takes therein the latch contents of the latch circuit 10 as the peak position information $\theta_{px}$ (steps $S_1$ and $S_2$). Then, it is determined whether the peak position information $\theta_{px}$ is greater than the sum of the top dead center angle $\theta_{TDC}$ and a certain angle, for instance 12 degrees, or not (step $S_3$). If $\theta_{px} > \theta_{TDC} + \alpha$, then the ignition angle $\theta_{IG}$ is advanced by $\Delta\theta$ (step $S_4$) and, if not, the ignition angle $\theta_{IG}$ is delayed by $\Delta\theta$ (step $S_5$). These actions from start to end, steps $S_1$ to $S_5$, are sequentially executed and cyclically repeated. This is the case with other programs which are referred to hereinafter.

Figure 6:
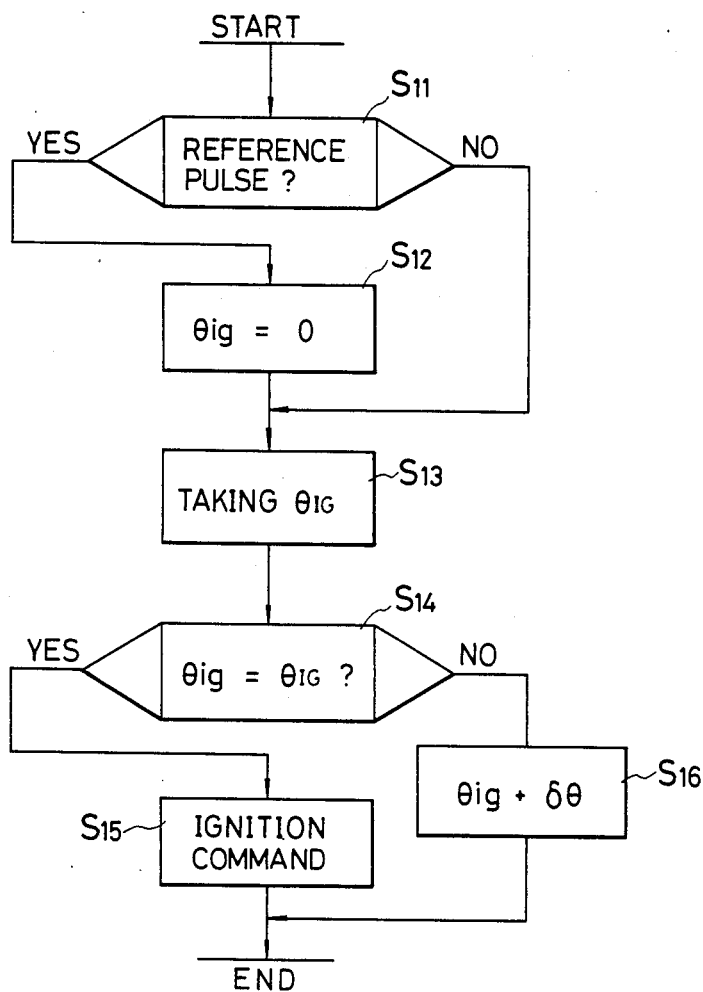

FIG. 6 shows an example of the action program of the ignition command circuit 9 when it is made of a micro-processor. When the ignition command circuit 9 detects the reference position signal (step $S_{11}$), the present value of the crank angle $\theta_{ig}$ is set to $\theta_{TDC}$ (or a predetermined value) (step $S_{12}$). Then, the ignition angle data $\theta_{IG}$ from the ignition angle establishing circuit 8 is taken in (in step $S_{13}$) and this data is compared with the present value of the crank angle $\theta_{ig}$. If the relationship $\theta_{ig} = \theta_{IG}$ holds, the ignition command is issued (steps $S_{14}$ and $S_{15}$) and the ignition switch SW is closed. On the other hand, if $\theta_{ig} \neq \theta_{IG}$ holds, a unit angle $\delta\theta$ is added to the $\theta_{ig}$ (step $S_{16}$) and the program flow stands by for the next program cycle. It is also possible to determine whether the difference between the $\theta_{ig}$ and $\theta_{IG}$ is greater or smaller than $\delta\theta$, in step $S_{14}$, instead of determining whether $\theta_{ig} = \theta_{IG}$ holds or not.

In the above-described embodiment, the peak position data $\theta_{px}$ was obtained in every engine cycle and the ignition angle for the next engine cycle is determined on the basis of the $\theta_{px}$ of the current engine cycle.

Figure 7:
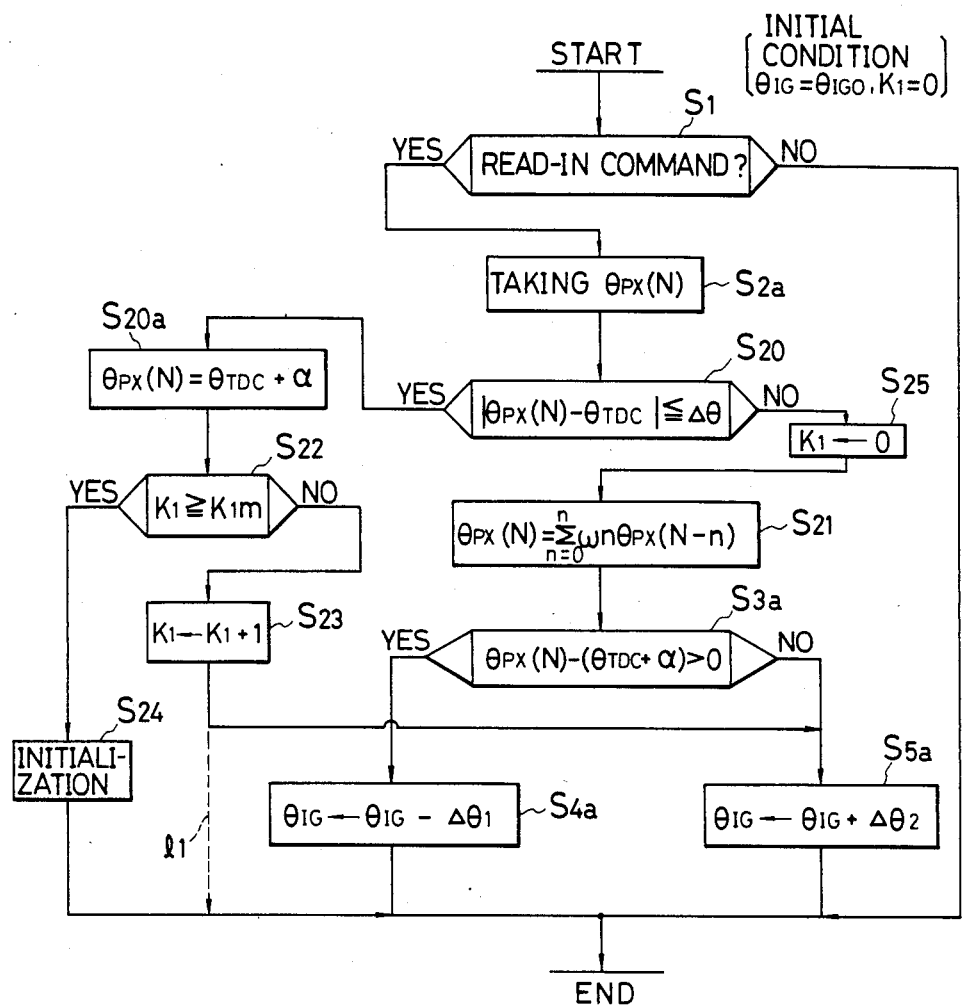
FIGS. 7 through 11 and 13 are flow charts describing action modes of a part of FIG. 2, which are respectively modified from that of FIG. 5.

FIG. 7 shows another example of the action program for the ignition angle establishing circuit 8 in the ignition timing control device according to the present invention. In this program, the basic flow is not different from that of the program of the flow chart given in FIG. 5, that is the indicative pressure peak data $\theta_{px}$ is taken in by the circuit 8 while the read-in command signal from the decoder 11 is present (steps $S_1$ and $S_{2a}$) and the ignition angle is delayed or advance in dependence on the difference between the $\theta_{px}$ and $(\theta_{TDC} + \alpha)$ (steps $S_{3a}$, $S_{4a}$ and $S_{5a}$).

However, according to this embodiment, $\theta_{px}$ is grasped as a group of data which are generated in sequence and the indicative pressure peak position data obtained in the N-th engine cycle is expressed as $\theta_{px}(N)$ (step $S_{2a}$).

When an engine misfire occurs, combustion will not take place in the cylinder and the indicative pressure peak arises in the vicinity of $\theta_{TDC}$. Since, furthermore, the indicative pressure peak position data obtained in the engine cycle involving a misfire is not based on normal combustion, it is not appropriate to be used as a basis for the indicative pressure peak position control of the subsequent engine cycle. Therefore, $\theta_{px}(N)$ and $\theta_{TDC}$ are compared in advance and the arithmetic operation for $\theta_{px}(N)$ is performed only when the difference thereof is greater than $\Delta\theta$ (steps $S_{20}$ and $S_{21}$). In this arithmetic operation step $S_{21}$, the current data value is corrected by the preceding indicative pressure peak position data values in the (N−1)-th, (N−2)-th, ..., (N−n)-th engine cycles according to the following formula to enhance the stability of the feedback system.

$$\theta_{px}(N) = \sum_{n=0}^{n} \omega_n \theta_{px}(N - n)$$

As a concrete example, the current data may be derived from the average value of the four preceding data and the current data by setting $\omega_0 = \omega_1 = \omega_2 = \omega_3 = \omega_4 = 1/5$ and $\omega_5 = \omega_6 = \ldots = \omega_n = 0$. The averaging method is not limited by this, but may be based on averaging of an arbitrary number of data elements. It is also possible to set $\omega_n = (1/L)^n$ (where $L > 1$ and $n > 0$).

The ignition angle advance and delay control may be made according to the thus derived results of comparison between $\theta_{px}$ and $(\theta_{TDC} + \alpha)$ (steps $S_{4a}$ and $S_{5a}$), but the angle advance $\Delta\theta_1$ and the angle delay $\Delta\theta_2$ need not be equal to each other but it may be that either $\Delta\theta_1 > \Delta\theta_2$ or $\Delta\theta_1 < \Delta\theta_2$ in dependence on the characteristics of the feedback system. Further, $\Delta\theta_1$ and $\Delta\theta_2$ may be functions of the difference between $\theta_{px}$ and $(\theta_{TDC} + \alpha)$.

When the difference between $\theta_{px}$ and $\theta_{TDC}$ is equal to or less than $\theta_{px}(N)$ is made equal to $\theta_{TDC} + \alpha$ (step $S_{20a}$). As long as $K_1 < K_{1m}$ (step $S_{22}$), $K_1$ is set to equal to $K_1 + 1$ and an ignition angle delay control is conducted, and, if $K_1 \geq K_{1m}$ by consecutive occurrence of misfires, and initialization step is conducted for resetting the ignition timing (step $S_{24}$). If $|\theta_{px} - \theta_{TDC}| > \Delta\theta$, then $K_1$ is set to zero and the program flow advances to the next step (step $S_{25}$). It is also possible not to conduct the ignition angle delay control when the engine misfire occurs and let the program flow advance to the next program cycle as indicated by the broken line $l_1$. It is also possible to ignore the exhaust stroke of the engine when this ignition timing control device is applied to a four-stroke engine. When it is the case, the exhaust stroke detection sensor may be omitted.

Figure 8:
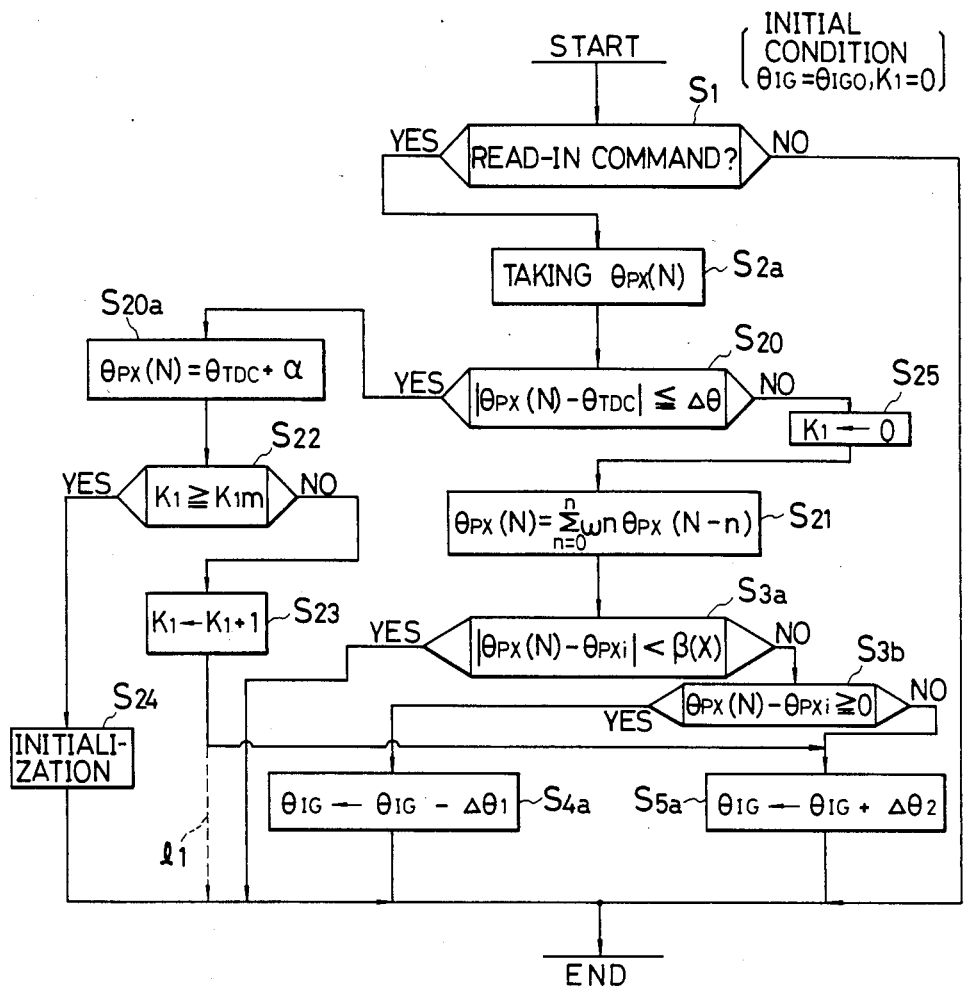

FIG. 8 shows still another example of the action program for the ignition angle establishing circuit 8. In this program, the control target value $\theta_{pxi}$ is not set to the single angle $(\theta_{TDC} + \alpha)$ but is set to a control target zone $\theta_{pxi} \pm \beta(x)$. Thereby, the stability of the feedback system may be improved. The parameter x of $\beta(x)$ may be any one of engine rotational speed Ne, throttle opening $\theta_{TH}$ or engine intake manifold vacuum $P_B$. It is also possible to vary the value of $\beta$ using a combination of these parameters as a variable. Otherwise, this program is similar to that of FIG. 6. Further, it is also possible to set $\beta(x)$ as a constant $\beta$.

Figure 9:
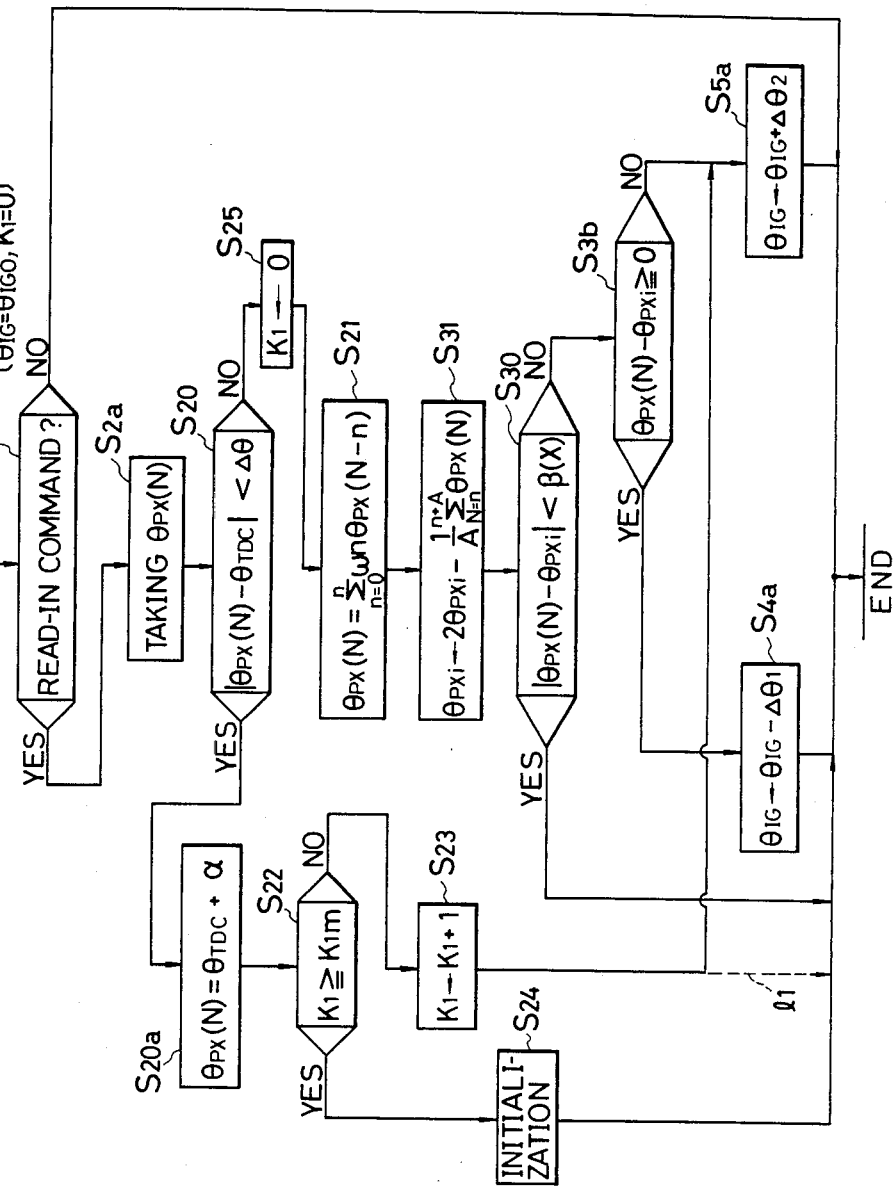

FIG. 9 shows another example of the action program performed by the ignition angle establishing circuit 8. In this program, the control target value $\theta_{pxi}$ for $\theta_{px}(N)$ is not fixed but the difference between $\theta_{pxi}$ and the average value of $$\theta_{px}(N) \left( = \frac{1}{A} \sum_{N=A}^{n \pm A} \theta_{px}(N) \right)$$

is taken into consideration for deriving $\theta_{pxi}$ to obtain a new $\theta_{pxi}$ which is equal to $(2\theta_{pxi}-\theta_{px}(N))$.

This program is the same as the program given in the flow chart of FIG. 8 except the above mentioned point.

Figure 10:
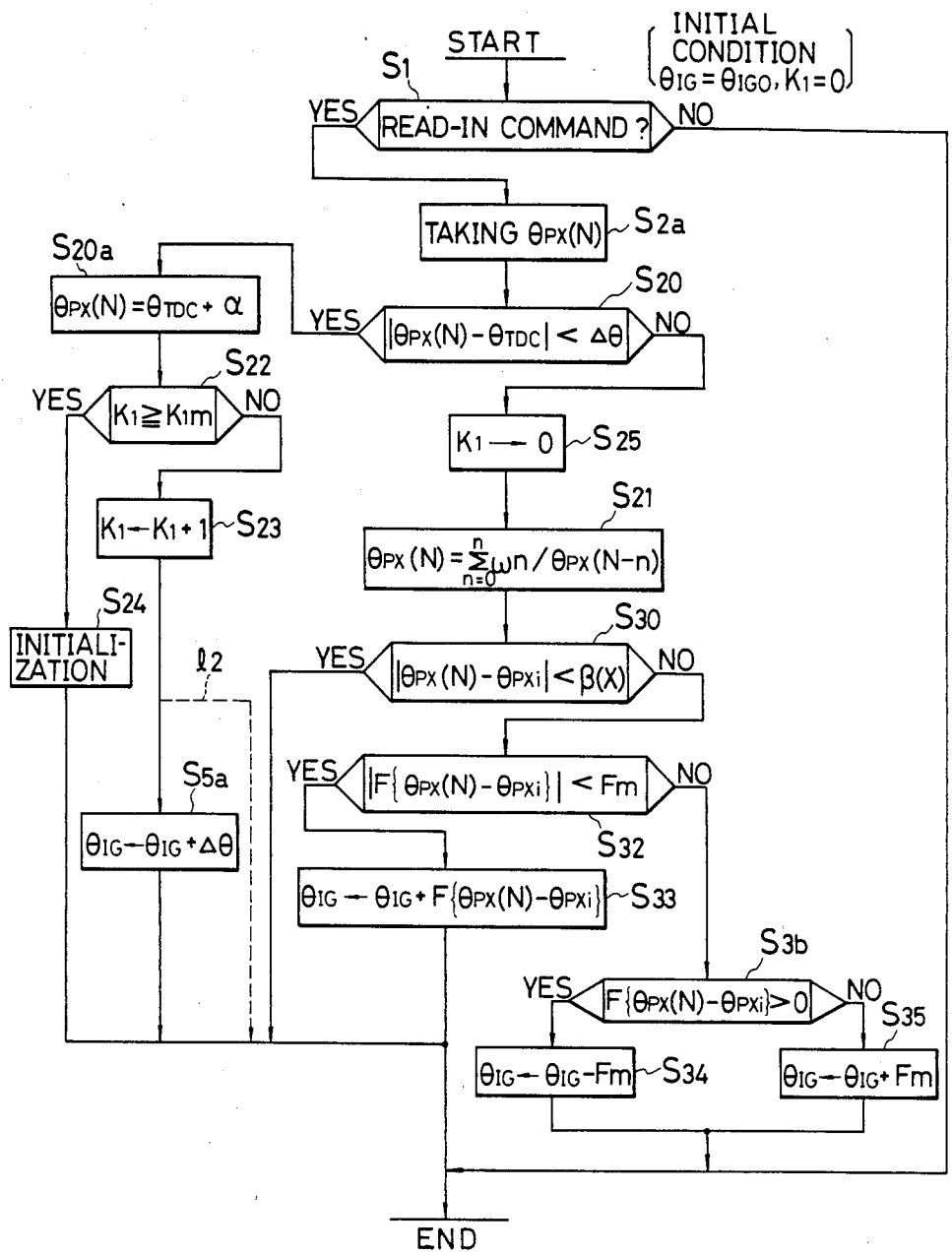

FIG. 10 shows another example of the action program to be performed by the ignition angle establishing circuit 8. This program is the same as the program of FIG. 7 in that the control target value $\theta_{pxi}$ for $\theta_{px}(N)$ is determined as a control target zone $\theta_{pxi}\pm\beta(x)$ instead of a single angle. However, the correction of $\theta_{IG}$ is given by an odd function $F[\theta_{px}(N)-\theta_{pxi}]$ having the deviation of $\theta_{px}(N)$ from $\theta_{pxi}$, or $[\theta_{px}(N)-\theta_{pxi}]$, as a variable (step $S_{33}$). This odd function $F(Z)$ may be an odd function having a single inflection point which may be expressed in the general form of $(Z-\gamma)^n$ such as Z, $Z^3$, $Z^5$, ... In particular, when $n\geq3$, the feedback is rapidly increased as the deviation of $\theta_{px}(N)$ from the target value $\theta_{pxi}$ increases and a brisk feedback control may be expected. On the other hand since the possibility of producing hunting may arise in the feedback system when the feedback is excessive, the maximum feedback is limited. The above-described actions are conducted in the steps $S_{32}$, $S_{34}$ and $S_{35}$ of the flow chart of FIG. 9.

In this case, the step $S_{5a}$ which delays the ignition timing by $\Delta\theta$ may be either conserved or omitted, as it is indicated by a broken line $l_2$.

Figure 11:
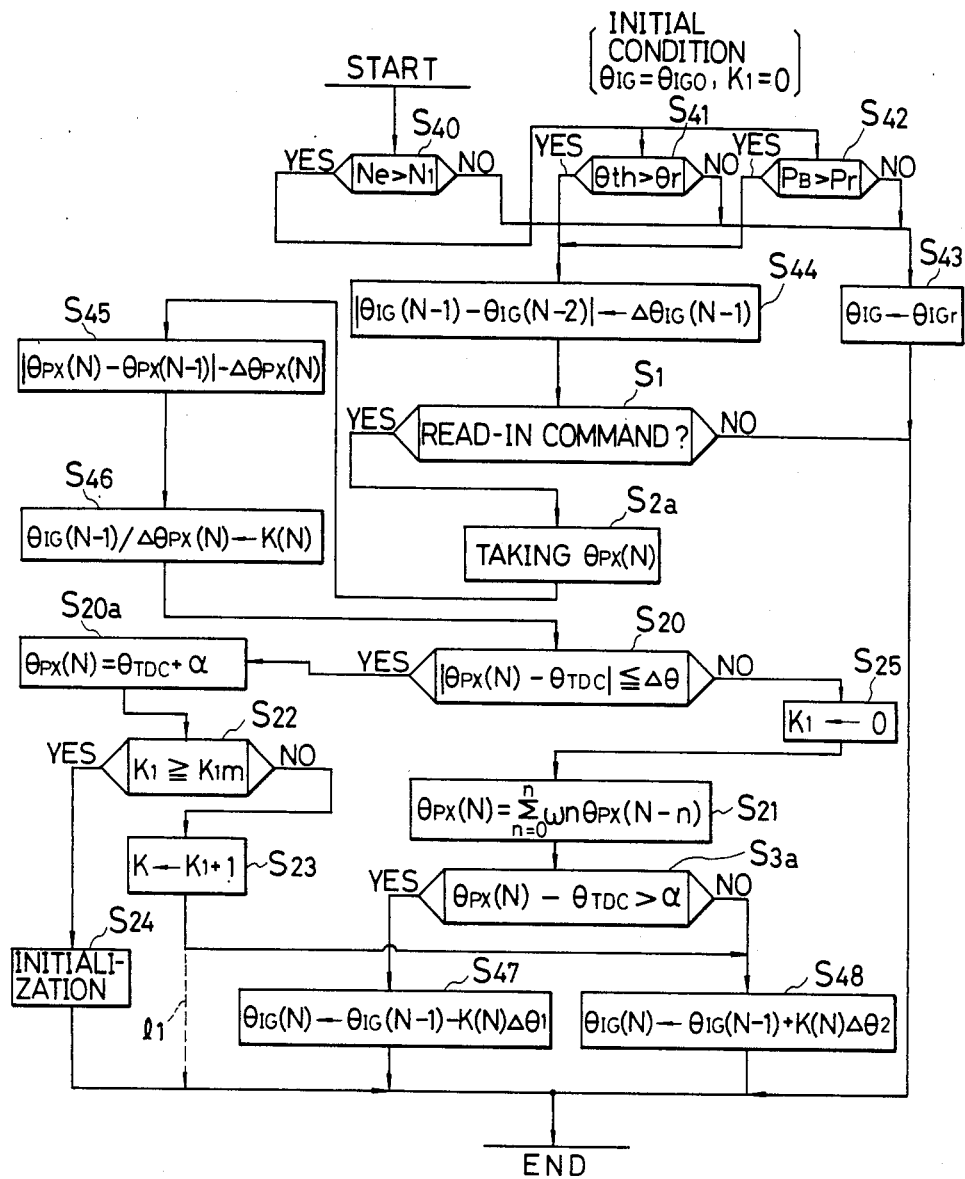
Figure 12:
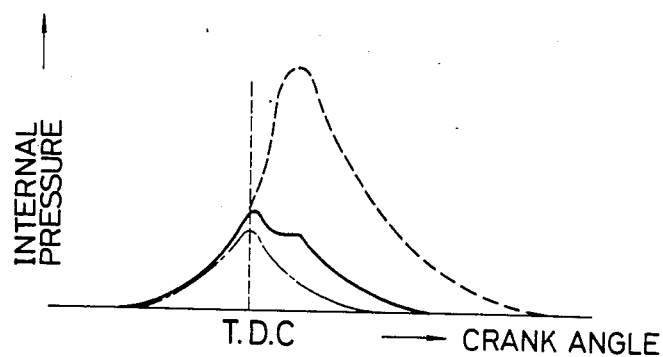
FIG. 12 is a graph showing that the indicative pressure change curve in dependence on the engine operating condition.

FIG. 11 shows yet another example of the action program of the ignition angle establishing circuit 8. Specifically, in this program, rotational speed of the engine Ne, throttle opening $\theta_{th}$, an intake manifold vacuum $R_B$, among various engine parameters, are compared with reference values Nr, $\theta r$ and Pr, respectively, and the ignition angle $\theta_{IG}$ is fixed to $\theta_{IGr}$ insofar as they do not exceed their reference values (steps $S_{40}$, $S_{41}$, $S_{42}$ and $S_{43}$). These steps S40, S41 and S42 function as discrimination means for discriminating an engine condition in which an open-loop control is preferred. The reference ignition angle $\theta_{IGr}$ may be varied in accordance with either engine parameters such as engine rotational speed and so on or a value selected from a map based on engine parameters. When either one of Ne, $\theta_{th}$ and $P_B$ has exceeded Nr, $\theta r$ and Pr, respectively, the feedback action is to take place. The reason why the switch over between the determination of the ignition angle $\theta_{IG}$ based on feedback control on the basis of various engine parameters and the use of the fixed $\theta_{IGr}$ is made here is, the indicative pressure near the top dead center due only to the compression of air may be greater than the indicative pressure near the top dead center due to the combustion in the cylinder. When the engine rotational speed is low, the changes in the indicative pressure in such a case are shown by the chain-dot line in FIG. 12. When the throttle opening is small or the intake manifold vacuum is great, the engine load is small or the throttle opening is extremely small, the indicative pressure changes in such a manner as shown by a solid line curve in FIG. 12. In this case, the position of the maximum indicative pressure peak is also located near the top dead center and it is not suitable to feedback control the ignition angle. The dotted line curve in FIG. 12 shows the changes of the indicative pressure under normal operation condition. It is now to be understood that either step S41 or S42 may be omitted, if preferred.

When it is detected that the engine is under normal operation condition or, in other words, is not in the state of low engine rotational speed, the state of extremely small throttle opening or the state of low engine load condition, the indicative pressure peak position $\theta_{px}(N)$ is taken. However, in this program, the difference $\Delta\theta_{IG}(N-1)$ between the ignition angle $\theta_{IG}(N-1)$ which was set up in the previous program cycle and the ignition angle $\theta_{IG}(N-2)$ which was set up in the yet previous program cycle is first computed (step $S_{45}$). Then, upon detection of the presence of the read-in command signal, the indicative pressure peak data $\theta_{px}(N)$ is taken (steps $S_1$ or $S_{2a}$). Thereafter, the contents of the step $S_{44}$ may be executed.

Then, the difference $\Delta\theta_{px}(N)$ between the present $\theta_{px}(N)$ and the preceding $\theta_{px}(-1)$ is computed (step $S_{45}$), and the ratio K(N) of $\Delta\theta_{px}(N)$ to the already obtained $\Delta\theta_{IG}(N-1)$ is derived in the step $S_{46}$. Thereafter, the steps $S_{20}$, $S_{21}$, $S_{22}$, $S_{23}$, $S_{24}$, $S_{25}$ and $S_{3a}$ are executed in the same way as described in connection with FIG. 7.

In thus advancing or delaying the previous ignition angle $\theta_{IG}(N-1)$ according to the peak position of $\theta_{px}(N)$, $\theta_{IG}(N-1)$ is either decreased or increased by $K(N)\cdot\Delta\theta_1$ or $K(N)\cdot\Delta\theta_2$ (steps $S_{47}$ and $S_{48}$).

It means that, since the current peak position $\theta_{px}(N)$ is based on the ignition angle $\theta_{IG}(N-1)$ computed during the preceding cycle and the previous peak position is based on the yet previous ignition angle $\theta_{IG}(N-2)$, the degree of influence of the change $\Delta\theta_{IG}(N-1)$ from $\theta_{IG}(N-2)$ to $\theta_{IG}(N-1)$ on the change $\Delta\theta_{px}(N)$ from $\theta_{px}(N-1)$ to $\theta_{px}(N)$ is represented by K(N) and it is reflected in the angle advance or delay control of the currently established ignition angle $\theta_{IG}(N)$ for the ignition of the next engine cycle.

Figure 13:
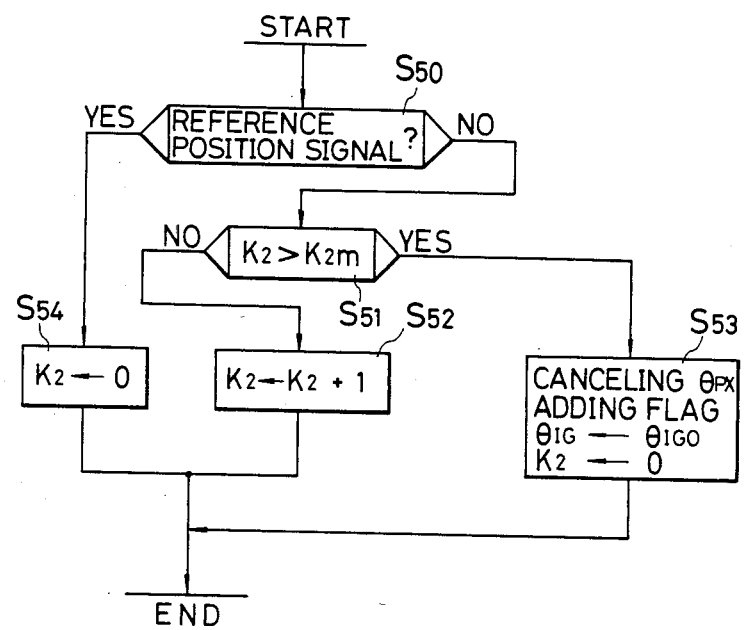

FIG. 13 shows a subroutine program which is effective for use in the ignition angle establishing circuit 8.

The ignition angle establishing circuit containing this subroutine program determines whether the reference position signal such as the TDC pulse is present or not (step $S_{50}$). If not, it is determined whether the time interval of the absence of the reference position signal has exceeded ($K_{2m}\times$clock period) or not (step $S_{51}$). If not, 1 is added to the constant $K_2$ and the program flow is terminated (step $S_{52}$). If, the time interval of the absence of the reference position signal has exceeded a time period of $K_{2m}\times$(clock period), then the set up ignition angle $\theta_{IG}$ is restored to the initial value $\theta_{IGO}$ and $K_2$ is set to zero while a cancel flag for disregarding this $\theta_{px}$ data is added to this $\theta_{px}$ data (step $S_{53}$). When the presence of the reference position signal is detected, $K_2$ is set to zero (step $S_{54}$).

This subroutine program is effective for determining the stoppage of the engine operation and for preparing the next engine start.

Figure 14:
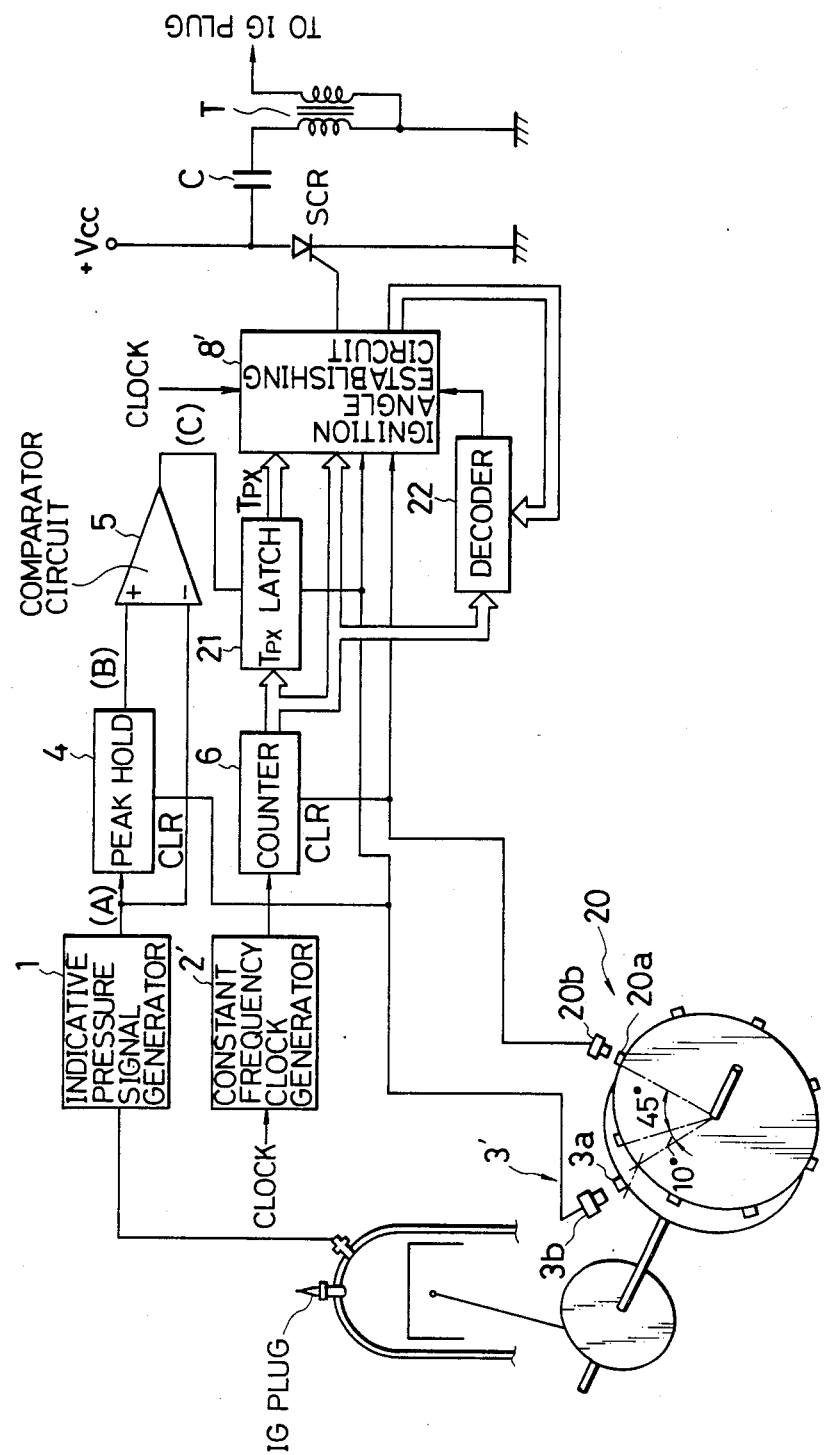
FIG. 14 is a block diagram showing another ignition timing control system according to the present invention.

In FIG. 14, there is shown another ignition timing control system according to the present invention which includes an indicative pressure signal generator 1 having the same function as the indicative pressure signal generator 1 shown in FIG. 2. There is provided a constant frequency clock generator 2' which produces a constant frequency clock signal. The frequency clock generator 2 may be a divider for dividing in frequency a high frequency clock signal for triggering a microprocessor used for an ignition angle establishing circuit 8' described hereinafter. A reference position signal generator 3' is made of a magnetic projection 3a mounted on a disc rotating in synchronism with the crank angle of the engine and a magnetic sensor 3b, such as a so-called pulser coil, for detecting the passage of the projection before it. The reference position signal or pulse produced from the reference position signal generator 3' appears at a crank angle of, for example, 10° before TDC. Thus, the reference position pulse may be referred to as a BTDC pulse. There is provided a peak hold circuit 4 which is the same as the peak hold circuit 4 of the embodiment shown in FIG. 2. A comparator 5 produces a peak detection pulse in response to the output signal from the peak hold circuit 4 and the indicative pressure signal as the peak hold circuit 5 of FIG. 2 functions. A counter 6 counts the clock pulses from the clock pulse generator 2' until it is cleared by a timing pulse produced from a timing pulse generator 20. The timing pulse generator 20 is composed of a plurality of magnetic projections 20a equidistantly mounted on the periphery of a disc rotating in synchronism with the crank shaft, and a magnetic sensor 20b for detecting passage of each of the projections before it so as to produce the timing pulse at each passage of the projection. In this embodiment, the projections are eight in total number and spaced from each other by 45°. A $T_{px}$ latch circuit 21 is adapted to latch the content of the counter 6 when it is triggered by the peak detection signal from the comparator 5 and to apply its latch content to an ignition angle establishing circuit 8'. The ignition angle establishing circuit 8' has a function basically similar to that of the ignition angle establishing circuit 8 and may be preferably formed of a microprocessor governed by a program as explained hereinafter. The content of the counter 6 is also applied to the ignition angle establishing circuit 8' and to a decoder 21. The decoder 21 is adapted to produce a read-in command signal when the content of the counter 6 becomes equal to a reference value. The decoder 21 may be a programable decoder which produces a logic "1" signal when its input digital signal is equal to the reference value determined by the parallel digital command signal which relates in this case to the engine speed signal Ne. This reference value is so determined as to relate to the engine rotational speed signal Ne produced from the ignition angle establishing circuit 8' so that the reference value constantly defines a crank angle range slightly larger than a crank angle range in which the indicative pressure peak may appear.

This arrangement is made to avoid adverse effect by any possible noises such as valve seating noises which may occur after the crank angle corresponding to the reference value. The ignition angle establishing circuit 8' reads the contents of the latch circuit 21 in response to the read-in command signal from the decoder 21 and determines that the indicative pressure peak has appeared at a crank angle corresponding to the latched content. The ignition angle establishing circuit 8' compares the latched content representing the indicative pressure peak position with the content of the counter 6 at the appearance of the timing pulse and calculates the present crank angle at which the indicative pressure peak has appeared. Then, the ignition angle establishing circuit 8' modifies a preceding crank angle calculated at a preceding cycle by adding thereto a certain angle value or subtracting therefrom another certain angle value to establish a new ignition angle for this time.

It is now to be understood that a gate may be provided for relaying the latched content of the latch circuit 6 to the ignition angle establishing circuit 8' in response to the read-in command signal from the decoder 22.

It is further to be noted that a circuit may be provided for calculating the engine rotational speed Ne on the basis of the constant frequency clock signal, timing pulses and a reference position signal.

The reference value may be determined in the decoder 12 to be inversely proportional to the engine rotational speed so as to produce the read-in command signal at a generally constant crank angle whereby it is possible to obtain a time period sufficient for the calculating of the ignition angle establishment in the ignition angle establishing circuit 8'.

The ignition angle establishing circuit 8' in this case functions to trigger a gate-controlled rectifier SCR in an ignition circuit of the so-called charge-discharge type.

FIGS. 15A through 15J are diagrams respectively showing waveforms of signals appearing in the system of FIG. 14 so as to explain the function of the ignition angle establishing circuit 8'.

Figure 15A:
FIGS. 15A through 15H and 15J are diagrams respectively showing waveforms of signals appearing in the circuit of FIG. 14.
Figure 15B:
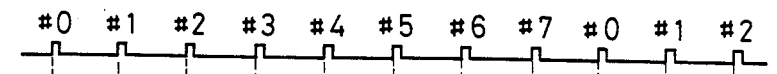

In FIGS. 15A and 15B, there are shown the reference pulses (each called as "A pulse" hereinafter) appearing at BTDC 10° and the timing pulses (each called as "B pulse") 10° after the "A pulse" and Nos. 1 through 7 "B pulses" appear consecutively with an interval corresponding to a 45° crank angle during each one complete rotation of the crank shaft.

Figure 15C:
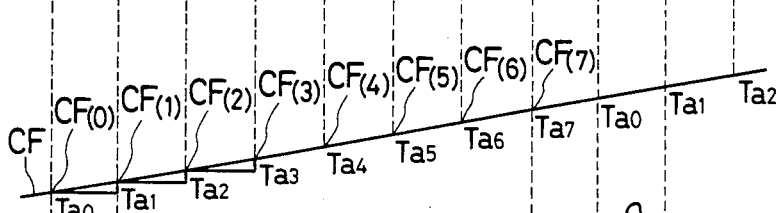

FIG. 15C shows a manner of variations of the count value CF in a free-run counter (not shown) contained in the ignition angle establishing circuit 8' in response to the clock pulses. It is to be noted that the counting frequency and phase for the free-run counter is made to coincide with those of the constant frequency clock 2'. A single oscillator may be provided for supplying the same frequency signal both to the constant frequency clock generator 2' and the ignition angle establishing circuit 8' in which the frequency signal is divided into a suitable reduced frequency.

Figure 15D:
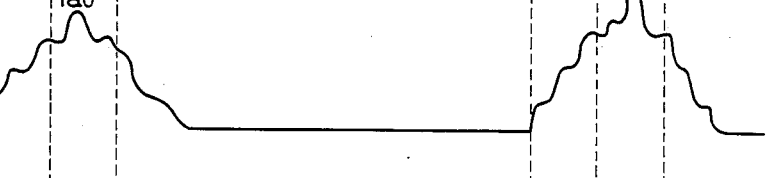
Figure 15E:
Figure 15F:
Figure 15G:

FIG. 15D shows in solid line variations of the indicative pressure signal produced from the indicative pressure signal generator 1. The comparator circuit 5 produces the peak detection signals as shown in FIG. 15E at the respective appearances of peaks of the indicative pressure signal. FIG. 15F shows manner of changes of the count value of the counter 6. FIG. 15G shows manner of changes of the latched value $T_{px}$ in the latch circuit 21.

Figure 15H:

FIG. 15H shows a manner of change in a count number T contained in the ignition angle establishing circuit 8', which count number T will be explained hereinafter with reference to FIG. 16.

Figure 15J:

FIG. 15J shows a waveform of an ignition command pulse produced from the ignition angle establishing circuit 8'.

Figure 16:
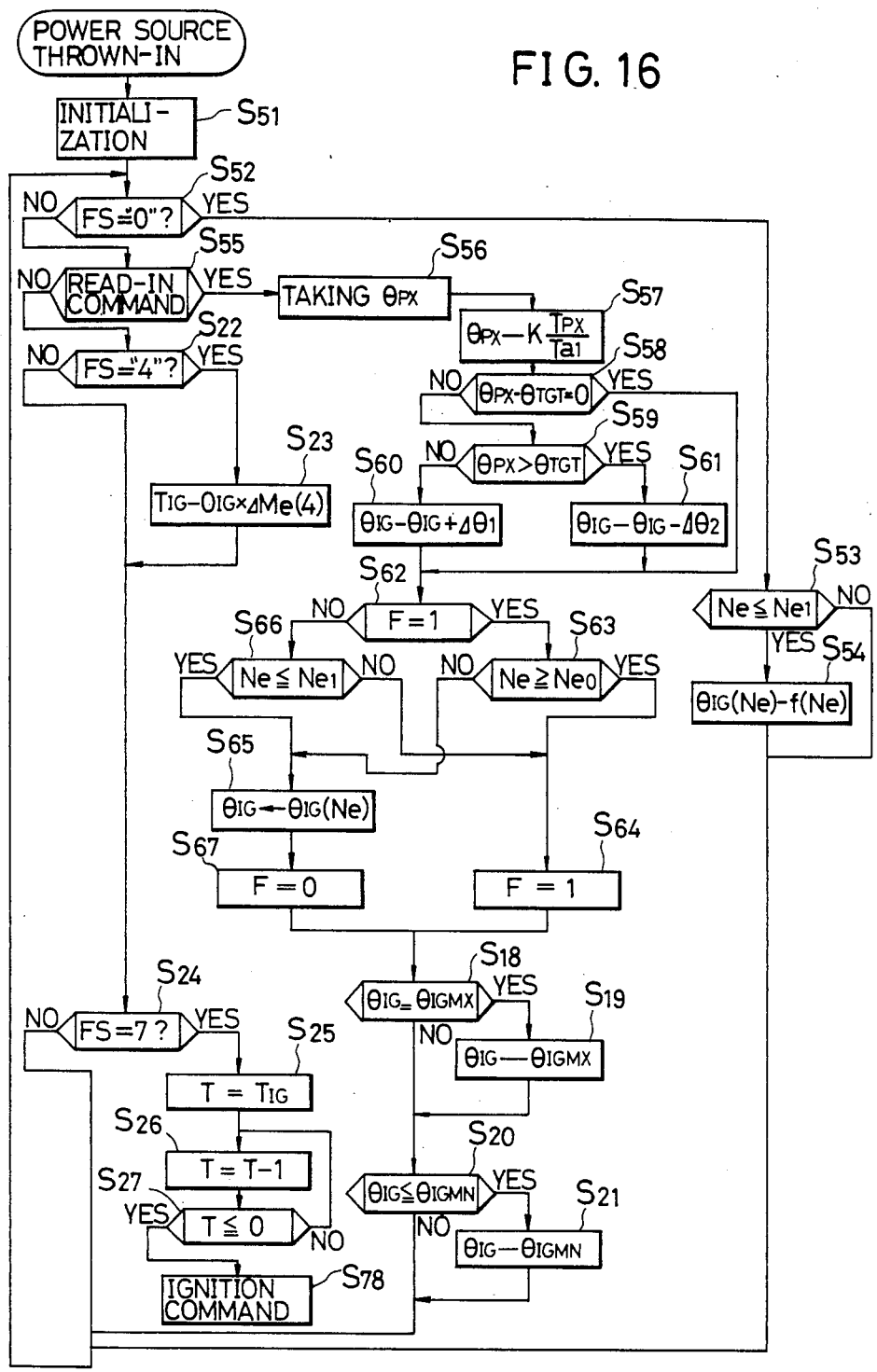
FIG. 16 is a flowchart showing an operation program performed in the ignition angle establishing circuit in the circuit of FIG. 14.

In FIG. 16, there is shown a flow chart describing main routine work performed by the ignition angle establishing circuit 8' which establishes an optimum ignition angle $\theta_{IG}$ and produces an ignition command or trigger signal when the actual crank angle reaches the established optimum crank angle $\theta IG$.

As seen from the figure, the power source is applied to the ignition angle establishing circuit 8' and ignition angle establishing circuit 8' starts performing the main routine work in sequence. At the first step $S_{51}$, a predetermined initialization is made. At a step $S_{52}$, a count value FS of an inside stage counter is reviewed, which stage counter is contained in the ignition angle establishing circuit 8' and triggered by the clock pulses in this ignition angle establishing circuit. If the count value FS is "0", the engine rotational speed signal Ne is picked up from a preselected memory area in a memory means (not shown) such as a ROM and the engine rotational speed signal Ne is compared with a critical engine speed Ne₁ such as 2800 r.p.m. (step S$_{53}$). When Ne is equal to or smaller than Ne₁, and engine speed related ignition angle $\theta_{IG}$(Ne) is made equal to a function value f(Ne) which may be a so-called map value (step S$_{54}$). When Ne is larger than Ne₁, the step S$_{52}$ is again performed. When the count value FS is equal to "0", then it is determined whether or not the read-in command signal from the decoder 22 exists (step S$_{55}$). When the read-in command signal exists, the T$_{px}$ latch data is taken from the latch circuit 21 (step S$_{56}$). Then, the indicative pressure peak angle $\theta_{px}$ is obtained by calculating K×T$_{px}$/T$_{al}$, where T$_{al}$ data is taken from the counter 6 by means of "B pulse" interruption routine starting at the leading edge of No. 1 "B pulse" while interrupting the main routine (step S$_{57}$). The thus obtained $\theta_{px}$ is compared with a target peak angle $\theta_{TGT}$ of, for example, an ATDC 12° crank angle (step S$_{58}$). When $\theta_{px}$ is not equal to $\theta_{TGT}$, then it is determined which is larger $\theta_{px}$ and $\theta_{TGT}$ (step S$_{59}$). When the angle $\theta_{px}$ is smaller than the target angle $\theta_{TGT}$, then the ignition angle $\theta_{IG}$ is retarded by $\Delta\theta_1$ (step S$_{60}$). When, to the contrary, the angle $\theta_{px}$ is larger than the angle $\theta_{TGT}$, then the ignition angle $\theta_{IG}$ is advanced by $\Delta\theta_2$ (step S$_{61}$). It is to be understood that $\Delta\theta_1$ may be equal to $\Delta\theta_2$, if preferred. It is further to be understood that the angle $\theta_{px}$ may be regarded as being equal to the target angle $\theta_{TGT}$ as long as a difference between the angles $\theta_{px}$ and $\theta_{TGT}$ is smaller than a predetermined small value. At the succeeding step S$_{62}$, it is determined whether or not a flag F exists (step S$_{62}$). The existence of F (F=1) means that the ignition angle $\theta_{IG}$ has been established during a one-time preceding cycle by means of this feedback ignition timing control which is referred to as the "feedback ignition timing control mode" hereinafter. When the flag F exists, the engine speed data Ne is compared with a predetermined engine speed data Ne₀ of, for example, 2500 r.p.m. which is smaller than the engine speed Ne₁ (step S$_{63}$. When the engine speed data Ne is equal to or larger than the data Ne₀, the flag F is made to be "1" (step S$_{64}$). When the engine speed data Ne is smaller than the data Ne₀, the ignition angle $\theta_{IG}$ is set to the already obtained angle $\theta_{IG}$(Ne) (step S$_{65}$). When, on the other hand, the flag F is equal to "0", it is true that the ignition angle $\theta_{IG}$ has been established, in the one-time previous cycle to be equal, to the map value f(Ne) through a "map control mode". At this moment, the engine speed data Ne is compared with the data Ne₁. (step S$_{66}$). When Ne is larger than Ne₁, the "feedback control mode" should be used in the present cycle and therefore the ignition angle $\theta_{IG}$ determined through the previous steps S$_{58}$ through S$_{61}$ is maintained and the flag F is set to "1". (step S$_{64}$) When, on the other hand, Ne is equal to or smaller than the data Ne₁, the "map control mode" is performed again in the present cycle and therefore the ignition angle $\theta_{IG}$ is made to be equal to the map value $\theta_{IG}$(Ne) (step S$_{65}$) and the flag F is made to be "0" (step S$_{67}$).

It should be understood that the two different critical values Ne₁ and Ne₂ are selectively used in dependence upon the value of the flag F in order to exhibit a hysteresis characteristic for the change-over between the map control mode and the feedback control mode. Thus, Ne₁ may be equal to Ne₂ and those steps for establishing and determining the flag F may be deleted if it is unnecessary to perform such a hysteresis characteristic.

The thus obtained $\theta_{IG}$ is confined between a maximum threshold $\theta_{IGMX}$ and a minimum threshold $\theta_{IGMN}$ during steps S$_{66}$ through S$_{71}$. Then, the execution will return to the step S$_{52}$.

When it is realized that the count value FS is equal to "4" in a step S$_{72}$ an ignition timing T$_{IG}$ is calculated as $\theta_{IG}$×Me(4) which has been obtained through a "B pulse" interruption routine explained hereinafter, so as to prepare the next ignition command.

When it is realized that the count value FS is equal to "7" in a step S$_{74}$, a count value T of an inner ignition counter (not shown) contained in the circuit 8 is set to the timing T$_{IG}$ in a step S$_{75}$. When the count vlaue T becomes zero or smaller than zero, then an ignition command is generated in steps S$_{75}$ through S$_{78}$. The ignition command is supplied to the gate terminal of the gate-controlled rectifier SCR through a certain port of the circuit 8'. FIG. 14H shows a manner of reduction of the count value T and FIG. 14J shows a waveform of the ignition command signal.

It is now to be understood that the above-mentioned main routine is performed in response to the constant frequency clock pulses. The "A pulse" interruption sub-routine shown in FIG. 16 is executed during interruption the main routine in response to the "A pulse". In the first step S$_{80}$ of this sub-routine, the count value FS is set to "−1". Then, an ignition command is generated in the next step S$_{81}$. This step S$_{81}$ is provided to avoid misfiring and therefore this step S$_{81}$ may be omitted, if preferred. Namely, a principal job performed by the "A pulse" interruption sub-routine is to present the count value FS of the stage counter to "−1".

FIG. 18 shows the "B pulse" interruption sub-routine to be executed in response to the "B pulse" while interrupting the main routine. In the first step S$_{90}$ thereof at which the "B pulse" rises up, the circuit 8' takes the respective count values Tam (m=0−7) of the clock counter 6 and the respective count values CF(m) (m=0−7). In the next step S$_{91}$, a data Me(m) is obtained by calculating a difference between a present value CF(m) and a preceding value CF(m−1). In the next step S$_{92}$, the values Me(m−7), Me(m−6), . . . , Me(m−1) are summed together to obtain Me(m). In the succeeding step S$_{93}$, an engine rotational speed Ne is given by inverting the value Me(m). Then, the engine speed Ne is compared with a cranking speed N$_{CR}$ such as 2000 r.p.m. at the next step S$_{94}$.

When Ne is smaller than N$_{CR}$, indicating that the engine is being cranked, the program enters the initialization step S$_{51}$. When, on the other hand, Ne is equal to or larger than N$_{CR}$, the count value FS of the stage counter is increased by "1" in the step S$_{95}$ and this subroutine ends to return to the main routine.

The ignition angle establishing circuit 8' is governed by the above-mentioned main routine program and "A pulse" and "B pulse" sub-routines, thereby to establish an ignition angle, to convert the established ignition angle into an ignition timing and finally to give the ignition command to the ignition circuit.

In the ignition timing control system described above with reference to FIGS. 14 through 18, the latch circuit 21 latches a count value of the counter 6 and the ignition angle establishing circuit 8' takes the latched count value when a count value of the counter 6 exceeds a reference value which varies in accordance with the engine rotational speed Ne. The ignition angle establishing circuit 8' will not be significantly influenced by any possible noise such as valve seating noises and ignition noises to be contained the indicative pressure signal and furthermore can determine the indicative peak position at a relatively early timing thereby to remain a sufficient time period for the calculation of the required ignition angle establishment.

Figure 19:
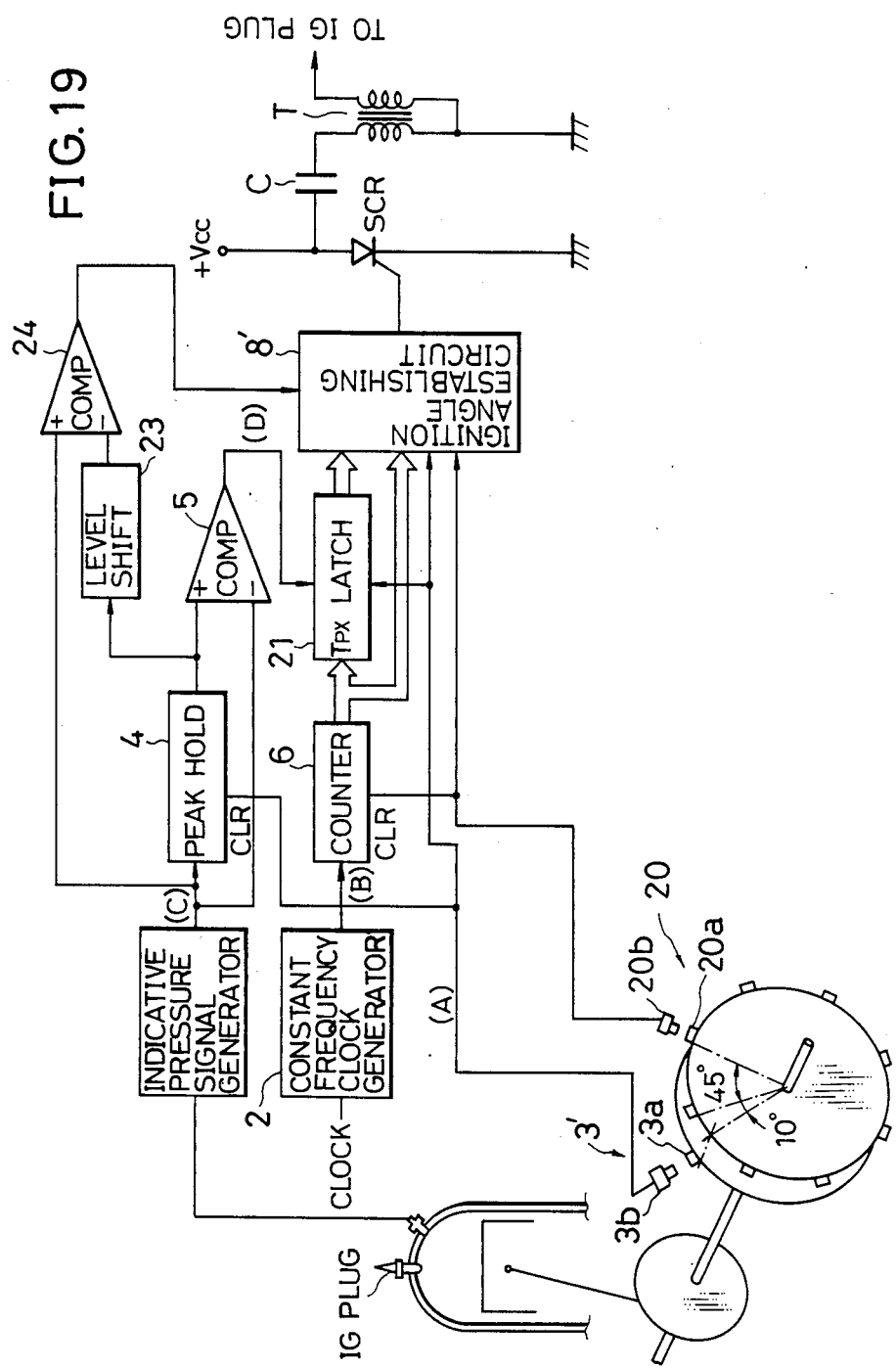
FIG. 19 is a block diagram showing another ignition timing control system according to the present invention.

FIG. 19 shows still another ignition timing control system identical to that of FIG. 14 except that the decoder 22 has been omitted but a level shifter 23 and a comparator 24 are substantial which produce a read-in command signal when the indicative pressure signal lowers below a reference level Vr which is obtained by suitably shifting in level from the indicative peak level PK, for example, a trisection of the peak level PK. The shifting rate of the level shifter 23 is determined according to experience or experiments.

The above arrangement is based on a fact that when the indicative pressure signal largely falls below a first indicative pressure peak, the particular first indicative pressure peak should the maximum and any noise peaks caused by noises such as valve seating noises will be ignored.

The ignition angle establishing circuit 8' takes the peak position count $T_{px}$ from the latch circuit 21 in response to the read-in command signal produced from the comparator 24 and calculate the indicative pressure peak position on the basis of the peak position count $T_{px}$ and a count content $T_{al}$ of the counter 6 at the appearance of a timing pulse so as to establish a present time ignition angle by modifying a previous ignition angle.

It is to be understood a gate circuit may be provided for relaying the peak position count $T_{px}$ from the latch circuit 21 to the ignition angle establishing circuit 8' in response to the read-in command signal.

Figures 20A, 20B, 20C, 20D, 20E, 20F, 20G:
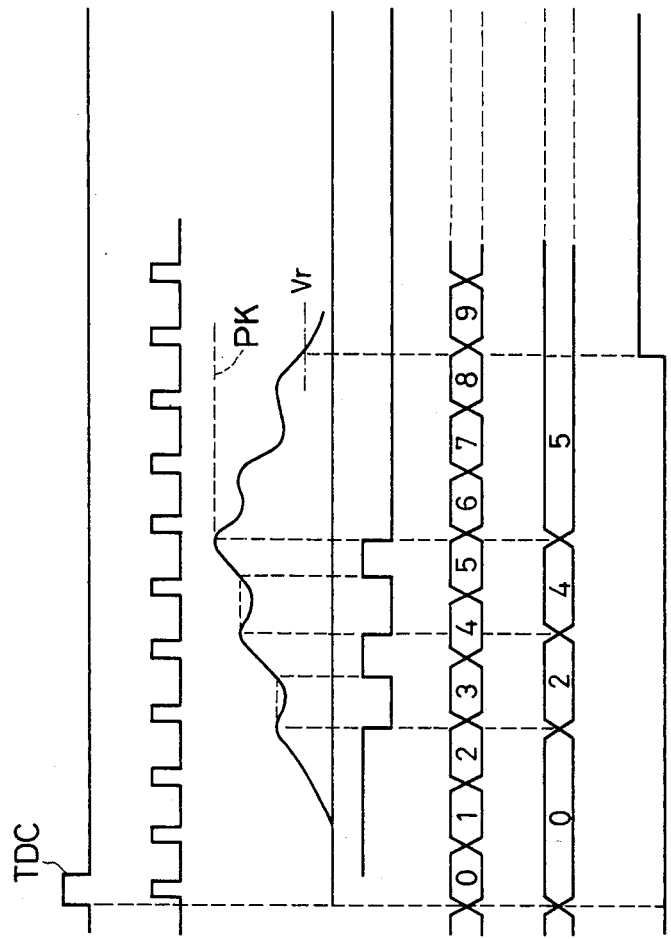
FIGS. 20A through 20G are diagrams respectively showing waveforms of signals appearing in the circuit of FIG. 19.

FIG. 20A shows the reference position pulse such as the BTDC pulse produced by the reference position signal generator 3' and FIG. 20B shows the constant frequency clock pulses consecutively appearing from the clock pulse generator 2'. FIG. 20C shows the indicative pressure signal in a solid line and the output signal from the peak hold circuit 4 in a broken line, the maximum level of which is indicated by PK. The reference level Vr is indicated by a phantom line.

FIG. 20D shows a waveform of the peak detection signal from the comparator 5 and FIG. 20E shows a manner of variation of the count value of the counter 6 which counts to constant frequency clock pulses from the generator 2' as already described. FIG. 20F shows a manner of variation of the latch content of the latch circuit 21. FIG. 20D shows a waveform of the read-in command signal from the comparator 24 which is issued when the indicative pressure signal falls in level below the reference level Vr.

As seen from the above, the ignition angle establishing circuit 8' takes the latch content in the latch circuit 21 as the peak position information immediately when the indicative pressure signal falls in level below the reference level Vr, so that the ignition angle establishing circuit 8' will not be adversely affected by a possible incorrect latch content of the latch circuit 21 which may be caused by valve seating noises etc. possibly contained in the indicative pressure signal.

Furthermore, it is possible to save time for the ignition angle establishing circuit 8' to take in the latch content from the latch circuit 21 in comparison with a system in which the indicative peak position information is determined at a predetermined ignition angle for example ATDC 60°.

It is to be understood that the read-in command generating system including the level shifter 23 and the comparator 24 can be utilized for the system of FIG. 2 while omitting the decoder 11, thereby applying the read-in command signal from the comparator 24 but not from the decoder 11 up to the ignition angle establishing circuit 8'.

Figure 21:
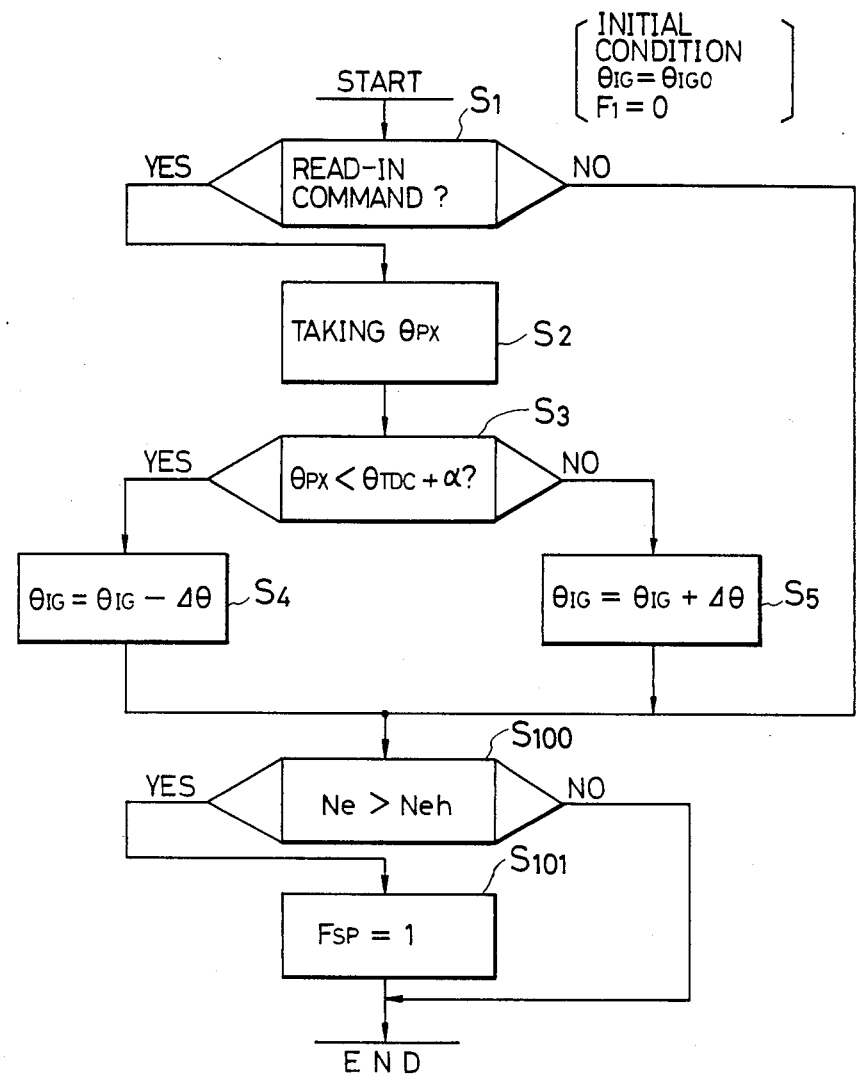
FIG. 21 is a flowchart showing an operation mode of a part of FIG. 2, which is modified from that of FIG. 5.

In FIG. 21, there is shown another program to be executed by the ignition angle establishing circuit 8, which is the same as that of FIG. 5 except that the former further includes a step $S_{100}$. In the step $S_{100}$, the engine rotational speed Ne is compared with a reference high speed Neh falling within an over rotation zone of the engine. When the engine rotational speed Ne exceeds the reference high speed Neh, an ignition prohibition flag $F_{sp}$ is established to be equal to a logic "1", in a step $S_{101}$.

Figure 22:
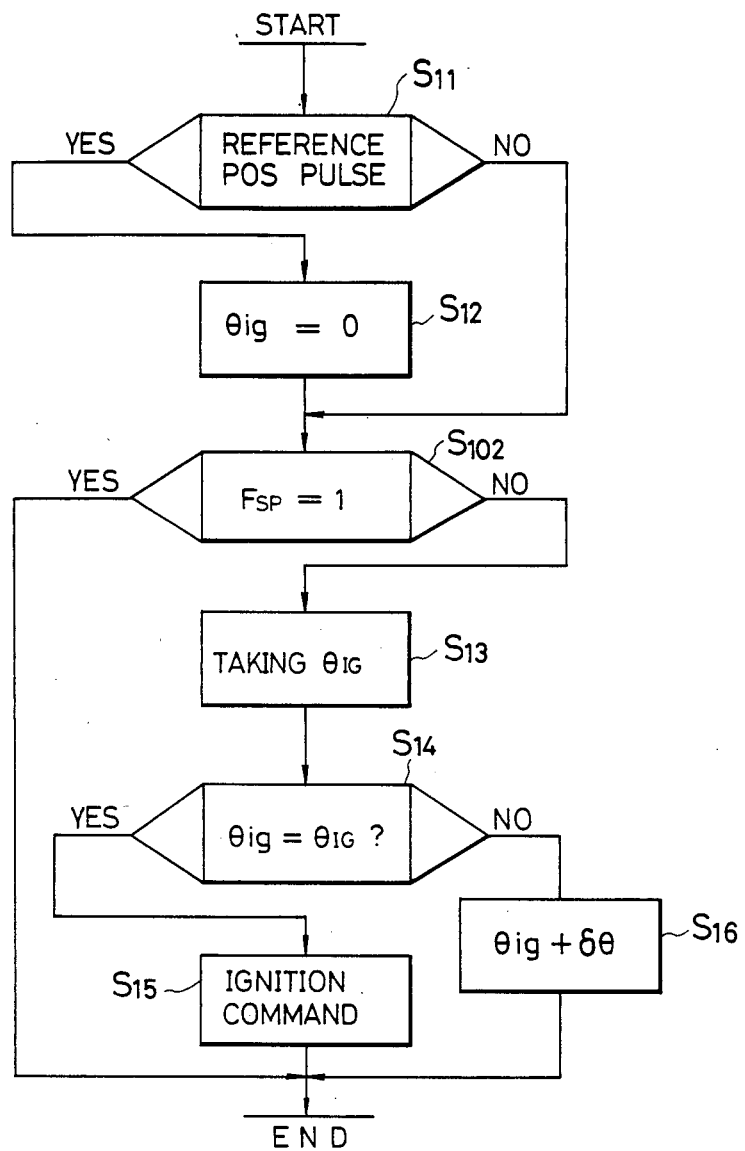
FIG. 22 is a flowchart showing an operation mode of a part of FIG. 2, which is modified from FIG. 6.

FIG. 22 shows another program to be executed by the ignition command circuit 9, which is the same as that of FIG. 6 except that the former further includes a step $S_{102}$ in which it is determined whether the ignition prohibition flag $F_{sp}$ is equal to "1" or not. When the flag $F_{sp}$ is equal to the logic "1" those steps $S_{13}$ through $S_{16}$ are bypassed thereby to prohibit the ignition command.

By the above-described arrangement, the ignition of the engine is prohibited while the engine rotational speed is within the over rotation zone, thereby to reduce the engine rotational speed.

Figure 23:
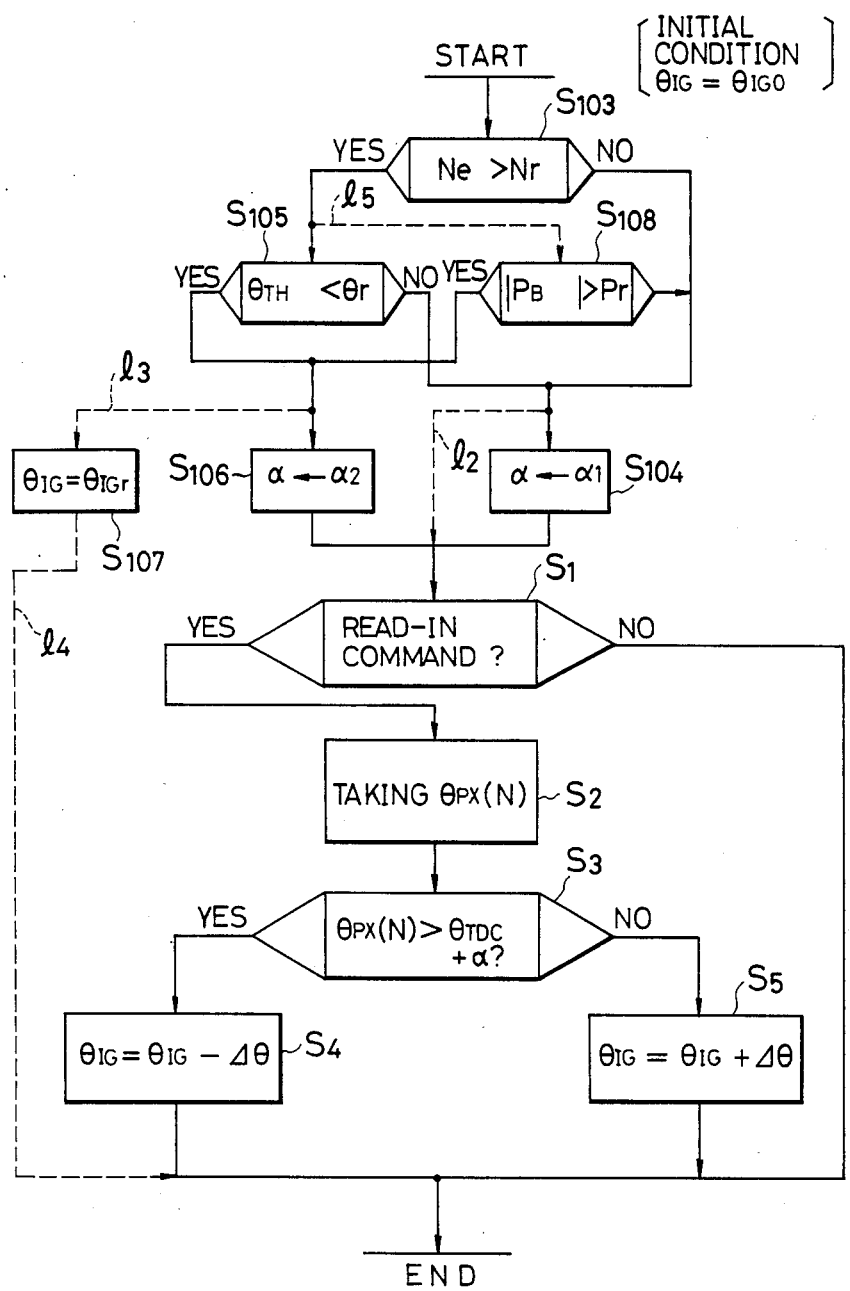
FIG. 23 is a flowchart showing an operation mode of a part of FIG. 2, which is modified from that of FIG. 5.

In FIG. 23, there is shown another program to be executed by the ignition angle establishing circuit 8, which is the same as that of FIG. 5 except that the former further includes steps for detecting the so-called engine-brake state of the engine.

In the step $S_{103}$, the engine rotational speed Ne is compared with a reference high speed Nr. Whena the engine speed Ne is equal to or lower than the reference high speed Nr, then the value $\alpha$ is set to a relatively smaller value $\alpha_1$ in a step $S_{104}$ and then the succeeding steps $S_1$ through $S_5$ are executed. The step $S_{104}$ may be bypassed as shown in a dotted line $l_2$, if preferred. When the engine rotational speed Ne is higher than the reference high speed Nr, the throttle opening $\theta_{TH}$ is compared with a reference small opening $\theta_r$ in a step $S_{105}$. When the throttle opening $\theta_{TH}$ is smaller than the reference small opening $\theta_r$, it can be determined that the engine is in the "engine brake" state, and therefore the value $\alpha$ is set to a relatively larger value $\alpha_2$ in a step $S_{106}$, thereby to cause the ignition angle for the succeeding cycles to be retarded. Otherwise, the next-cycle ignition angle may be set to a fixed ignition angle $\theta_{IGr}$, if preferred, in a step $S_{107}$ as indicated by dotted lines $l_3$ and $l_4$. The determination of the light load condition can be done by comparing the absolute value of the intake manifold vacuum $P_B$ with a predetermined pressure $P_r$ in a step $S_{108}$, as indicated by a line $l_5$.

It is to be understood that the predetermined value $\theta_{IGr}$ may be a variable which varies in accordance with one or more of the engine parameters, if preferred.

It is furthermore to be understood that the step $S_{107}$ may be replaced another step of setting the ignition prohibition flag $F_{sp}$, if preferred, so as to prohibit the ignition in cooperation of the program of FIG. 22.

By the above-mentioned arrangement, the ignition angle is retarded, or fixed to the predetermined ignition angle $\theta_{IGr}$ or the ignition is prohibited when the engine is in the engine braking state.

Figure 24:
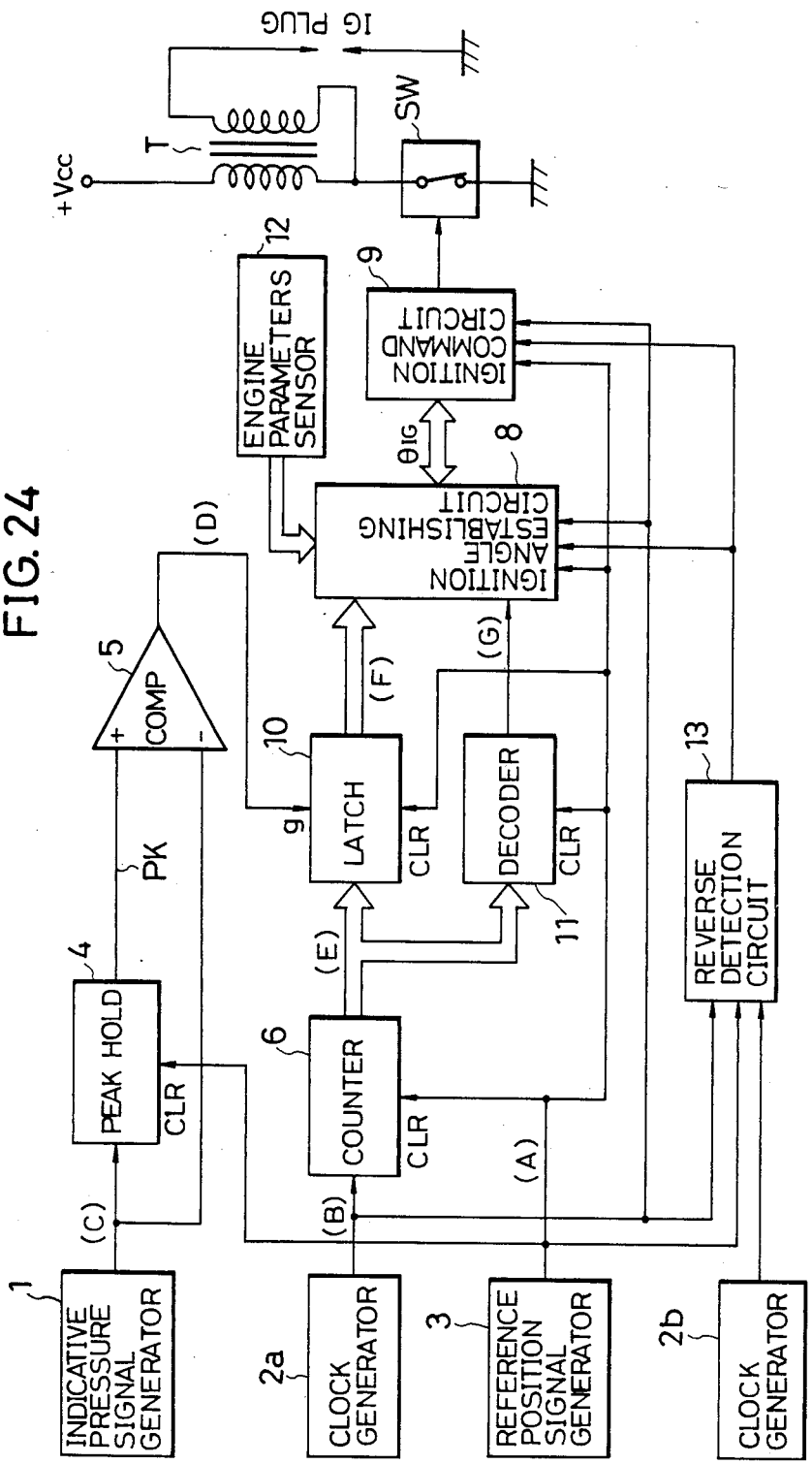
FIG. 24 is a circuit diagram showing another ignition timing control system according to the present invention.
Figure 25:
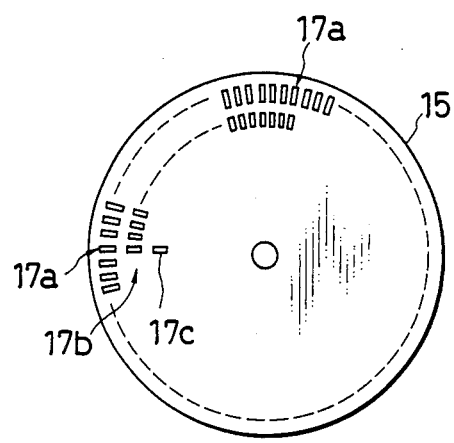
FIG. 25 is a diagram showing an element to be used for the clock generators in FIG. 24.
Figures 26A, 26B, 26C, 26D, 26E, 26F, 26G:
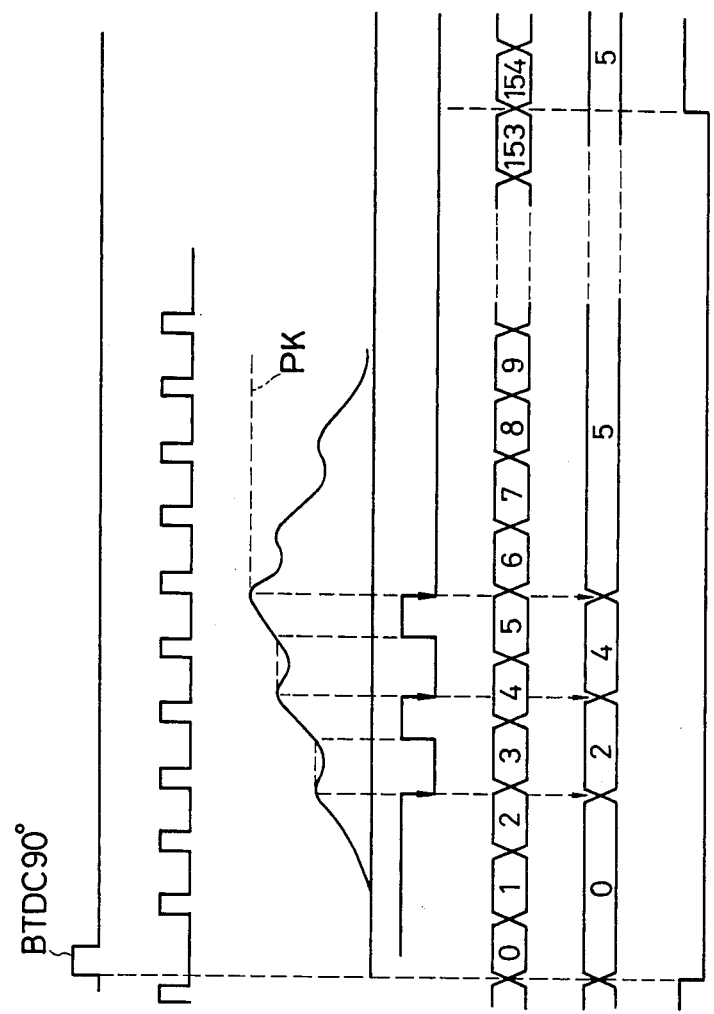
FIGS. 26A through 26G are diagrams respectively showing waveforms of signals appearing in the system of FIG. 24.

In FIG. 24, there is shown another ignition timing control system which is the same as that of FIG. 2 except that the clock pulse generator 2 is substituted for first and second clock pulse generator 2a and 2b respectively producing first and second clock pulses. The first and second generators 2a and 2b are, for example, composed of a pair of photocouplers (not shown) cooperative with a single disc 15 (FIG. 25) rotating in synchronism with the crank shaft. The disc 15 has a first group of slits 17a formed equiangularly through 360° and second group of slits 17b formed radially inward of the slits 17a and equiangularly through a small range from BTDC 90° to BTDC 10°. The first and second groups of slits 17a and 17b have the same circumferential width and offset from each other by an angle corresponding to the particular circumferential width. Those photocouplers are to be placed at the same angular position but respectively associate with the first and second groups of slits 17a and 17b.

The reference position pulse generator 3 is adapted to produce reference position pulses each appearing at a reference position of BTDC 90°. The reference position pulse generator 3 may be composed of a potocoupler (not shown) which associates with a reference position slit 17c formed on the disc 15.

The decoder 11 is, in this embodiment, adapted to produce the read-in command signal when the count value of the counter 6 reaches a predetermined number "153" since the reference position is before the TDC.

FIGS. 26A through 26G show waveforms of signals appearing in the circuit of FIG. 24. As seen from this figure, those waveforms are the same as those of FIGS. 3A through 3G except that the reference position pulse appears at the BTDC 90° and the read-in command signal appears when the count value of the counter 6 reaches the number "153".

It is to be understood that the ignition timing control system shown in FIG. 24 further includes a reverse rotation detector 13. The reverse rotation detector 13 is adapted to produce a reverse rotation detection signal when it detects the reverse rotation of the engine. The reverse rotation detection signal is applied to the ignition angle establishing circuit 8 and the ignition command circuit 9.

Figure 27:
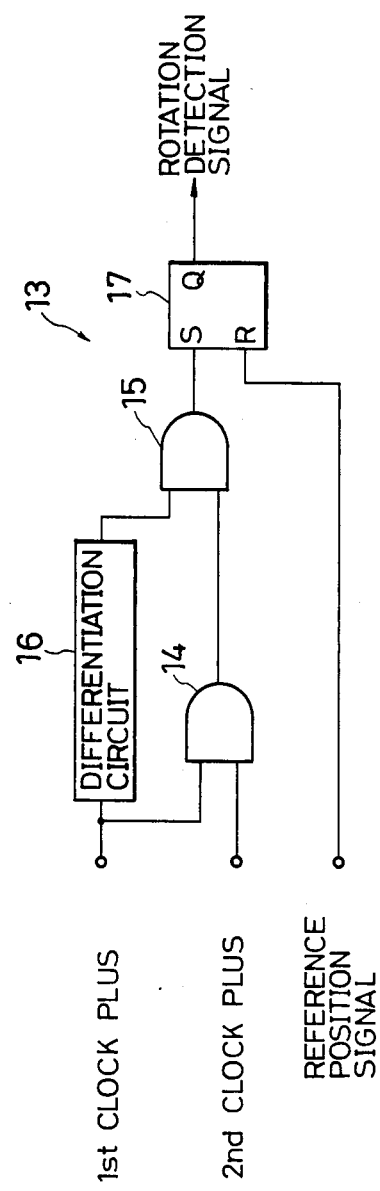

FIG. 27 shows an example of the reverse rotation detector 13. This reverse rotation detector includes an AND gate 14 having two input terminals to which the first and second clock pulses are applied. An output terminal of the AND gate 14 is connected to one input terminal of an AND gate 15 having another input terminal to which a pulse signal differentiated from the first clock pulse by a differentiator 16. An output terminal of the AND gate 15 is connected to a set terminal of a set-reset flip-flop circuit 17 having a reset terminal to which the reference position signal is applied.

When the engine rotates in the normal direction, the first and second clock pulses respectively have such waveforms as shown in FIGS. 28(a) and 28(b). Then the output signal of the AND gate 14 has such a waveform as shown in FIG. 28(c). The differentiator 16 produces the pulse signal appearing at the leading edge of each of the first clock pulses, as shown in FIG. 28(d). Therefore, the AND gate 15 does not produce any logic "1" signal on its output and accordingly the flip-flop 17 is kept the reset state in which the Q output is "0".

When, to the contrary, the engine rotates in the reverse direction, the second clock pulses have a phase more advanced than the first clock pulses, so that the AND gate 15 periodically produces the logic "1" signal thereby to set the flip-flop 17. In this instance, the Q output of the flip-flop 17 is "1" which is the reverse rotation detection signal.

Figure 30:
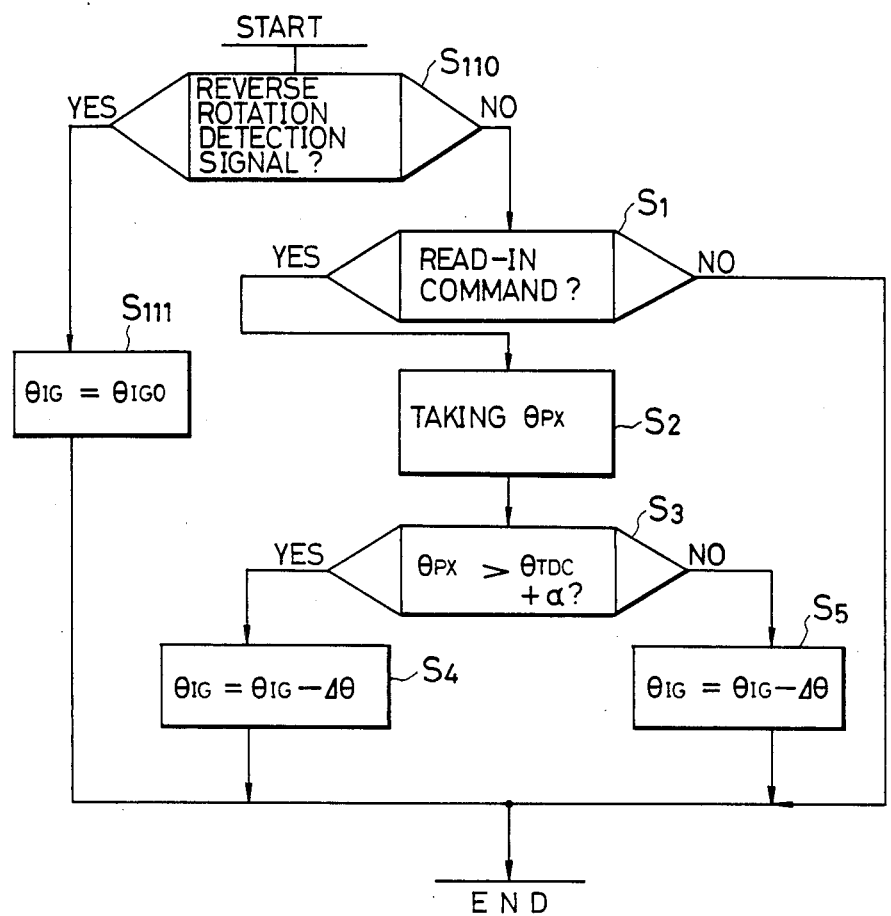
FIG. 30 is a flowchart showing an operation mode of a part of FIG. 24, which is modified from FIG. 5.

FIG. 30 shows another program to be executed by the ignition angle establishing circuit 8 which is the same as that of FIG. 5 except that the former further includes a step $S_{110}$ in which it is determined whether the reverse rotation detection signal exists or not. When the reverse rotation detection signal does not exist, the ignition angle establishing steps $S_1$ through $S_5$ are executed. When, however, the reverse rotation signal exists, the ignition angle $\theta_{IG}$ is set to a fixed angle $\theta_{IGO}$ without respect to indicative peak position signal.

Figure 31:
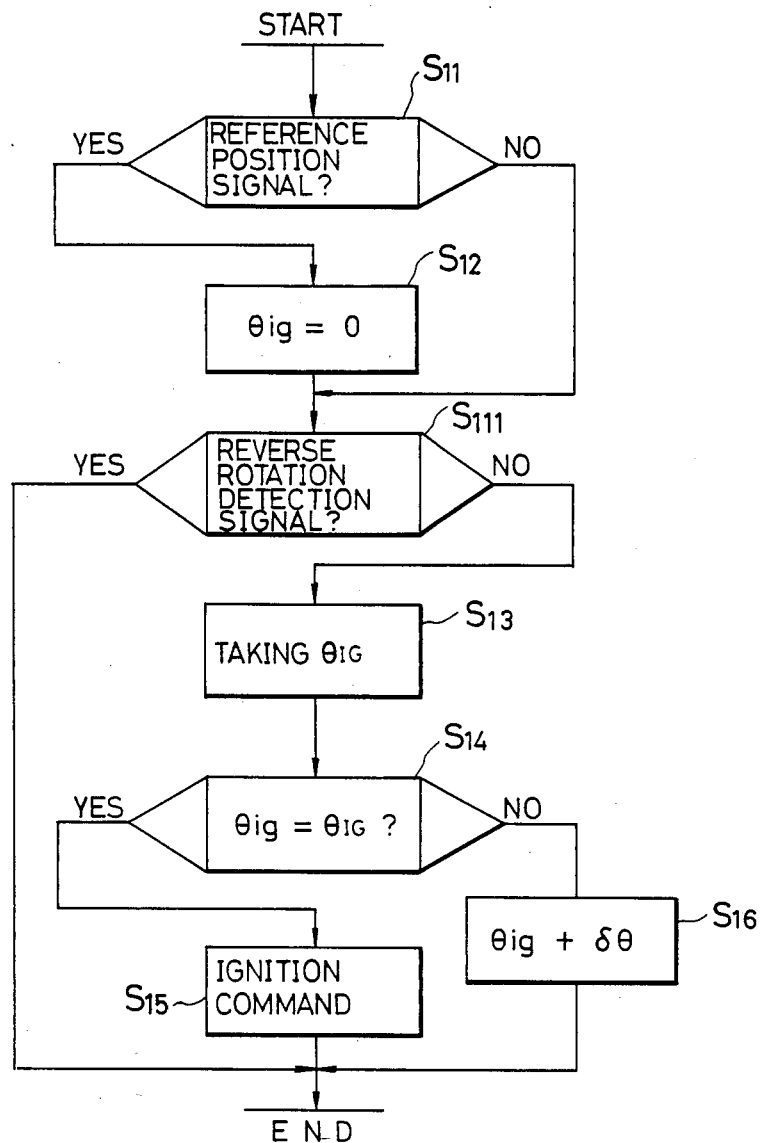
FIG. 31 is a flowchart showing an operation mode of a part of FIG. 24, which is modified from FIG. 6.

The ignition command circuit 9 executes a program shown in FIG. 31 which is the same as that of FIG. 6 except that the former further includes a step $S_{111}$ of determining the existence of the reverse rotation detection signal. When the reverse rotation detection signal exists, the steps $S_{13}$ through $S_{16}$ are bypassed thereby to prohibit the ignition command.

It is therefore to be understood that ignition is prohibited during the reverse rotation of the engine.

Since, on the other hand, the reference position pulse appears at a BTDC such as BTDC 90°, the ignition command is made even in the first engine cycle upon the engine-start operation, that is, the cranking state, so that the engine start can be readily made. This arrangement is most preferred when the engine is a motor cycle engine which is to be started by "kicking".

What is claimed is:

1. An ignition timing control system for an internal combustion engine, comprising:
   reference signal generating means for generating a reference position pulse each time the rotational angle position of said internal combustion engine reaches a reference crank angle position;
   pressure signal generating means for generating a pressure signal which is representative of the pressure in the combustion chamber of said engine;
   peak pressure position detecting means for detecting the position of the maximum peak pressure indicated by said pressure signal during an interval between the consecutive two of said reference position pulses so as to produce a peak pressure position data signal representing the crank angle of said engine at which maximum peak pressure occurs;
   ignition angle establishing means for establishing a next-cycle ignition angle at which said engine is to be ignited within the next engine cycle in accordance with said peak pressure position data signal; and
   ignition command means for supplying an ignition command to the ignition system of said engine at a timing when the actual crank angle reaches the established next-cycle ignition angle, in which said next-cycle ignition angle establishing means includes,
   first means for detecting engine parameters of said engine,
   second means for selectively producing either a feed-back control command or an open-loop control command signal in accordance with at least one of said engine parameters,
   third means for restablishing an open-loop ignition angle as said next-cycle ignition angle without respect to said peak pressure position signal in response to said open-loop control command signal,
   fourth means for comparing said peak pressure position data signal with a target peak pressure position in response to said feed-back control command signal so as to produce a discrimination signal indicating a relation between said peak pressure position signal and said target peak pressure position, and fifth means, operative when said feed-back control command signal is developed by said second means, for determining said next-cycle ignition angle in synchronism with the engine operation by modifying a previous cycle ignition angle which has been determined in a previous engine cycle, in accordance with said discrimination signal so as to reduce the difference between said target peak pressure position and the peak pressure position specified by said peak pressure position data signal.

2. An ignition timing control system according to claim 1, wherein said engine parameters are the engine rotational speed, the intake manifold vacuum, and the throttle opening.

3. An ignition timing control system according to claim 2, wherein said second means produces said open-loop command signal when the engine rotational speed is lower than a predetermined lower level.

4. An ignition timing control system according to claim 2, wherein said second means produces said open-loop command signal when the intake manifold vacuum or the throttle opening is small.

5. An ignition timing control system according to claim 2, wherein said second means produces said open-loop command signal when the engine rotational speed is higher than a predetermined higher level but either one of the intake manifold vacuum or the throttle opening is small.

6. An ignition timing control system according to claim 1, wherein said open-loop ignition angle is a fixed value.

7. An ignition timing control system according to claim 1, wherein said open-loop ignition angle varies in dependence on the engine rotational speed.

8. An ignition timing control system according to claim 2, wherein said next-cycle ignition angle establishing means further includes, sixth means for producing an ignition prohibition signal in accordance with the engine parameters, wherein the operation of said ignition command means is prohibited in response to said ignition prohibition signal.

9. An ignition timing control system according to claim 8, wherein said sixth means produces said ignition prohibition signal when the engine rotational speed is higher than a first predetermined higher speed but either one of the intake manifold vacuum and the throttle opening is small.

10. An ignition timing control system according to claim 9, wherein said sixth means produces said ignition prohibition signal when the engine rotational speed is higher than a second predetermined higher speed higher than said first predetermined higher speed.

11. An ignition timing control system according to claim 8, wherein said next-cycle ignition angle establishing means further includes, seventh means for producing a reverse rotation signal when the engine rotates in a reverse direction opposite to the normal direction of rotation, and wherein said sixth means produces said ignition prohibition signal in response to said reverse rotation signal.

12. An ignition timing control system according to claim 1, wherein said reference angle position is selected to be a position before the top dead center, and wherein said third means produces an open-loop ignition angle without respect to said indicative peak pressure position signal in response to said reference position pulse.

13. An ignition timing control system according to claim 1, wherein said ignition angle establishing means further includes, eighth means for performing initialization when no reference position pulse appear during a predetermined time period.

14. An ignition timing control system according to claim 3, wherein said second means produces said open-loop command signal when the engine rotational speed falls below a second predetermined lower level lower than said first predetermined lower level once said engine rotational speed exceeds said first predetermined lower level.

* * * * *